United States Patent
Xu et al.

(10) Patent No.: US 11,198,965 B2
(45) Date of Patent: *Dec. 14, 2021

(54) REMOTE CONTROL METHOD FOR WASHING MACHINE

(71) Applicant: QINGDAO HAIER DRUM WASHING MACHINE CO., LTD., Shandong (CN)

(72) Inventors: Sheng Xu, Shandong (CN); Zhenxing Huang, Shandong (CN); Wenwei Li, Shandong (CN); Jun Wu, Shandong (CN)

(73) Assignee: QINGDAO HAIER DRUM WASHING MACHINE CO., LTD., Shandong (CN)

( * ) Notice: Subject to any disclaimer, the term of this patent is extended or adjusted under 35 U.S.C. 154(b) by 64 days.

This patent is subject to a terminal disclaimer.

(21) Appl. No.: 16/491,797

(22) PCT Filed: Feb. 9, 2018

(86) PCT No.: PCT/CN2018/076053
§ 371 (c)(1),
(2) Date: Sep. 6, 2019

(87) PCT Pub. No.: WO2018/161786
PCT Pub. Date: Sep. 13, 2018

(65) Prior Publication Data
US 2021/0131009 A1    May 6, 2021

(30) Foreign Application Priority Data
Mar. 7, 2017    (CN) .......................... 201710131249.X

(51) Int. Cl.
*D06F 34/05*    (2020.01)
*D06F 34/20*    (2020.01)
(Continued)

(52) U.S. Cl.
CPC .............. *D06F 34/05* (2020.02); *D06F 34/20* (2020.02); *D06F 34/28* (2020.02); *D06F 37/42* (2013.01)

(58) Field of Classification Search
CPC ....................................................... D06F 34/05
See application file for complete search history.

(56) References Cited

U.S. PATENT DOCUMENTS

| | | | |
|---|---|---|---|
| 2014/0067094 A1 | 3/2014 | Park et al. | |
| 2014/0067131 A1 | 3/2014 | Park et al. | |
| 2014/0156082 A1* | 6/2014 | Ha ..................... | H04L 12/2818 700/275 |

FOREIGN PATENT DOCUMENTS

| | | |
|---|---|---|
| CN | 103685450 A | 3/2014 |
| CN | 103685451 A | 3/2014 |
| CN | 203795183 U | 8/2014 |

OTHER PUBLICATIONS

International Search Report (PCT/ISA/210) dated May 14, 2018, by the Chinese Patent Office as the International Searching Authority for International Application No. PCT/CN2018/076053.

(Continued)

*Primary Examiner* — Jason Y Ko
(74) *Attorney, Agent, or Firm* — Buchanan Ingersoll & Rooney PC

(57) ABSTRACT

A remote control method for a washing machine includes the following steps: establishing, between a mobile terminal and the washing machine, a control channel used to transmit a control instruction and a status feedback channel used to transmit a working status of the washing machine; obtaining status information of the washing machine; and when the status information does not match preset information by which the mobile terminal remotely controls the washing machine, cutting off the control channel, and maintaining the status feedback channel. When the washing machine is (Continued)

remotely controlled by the mobile terminal, corresponding state conditions are controlled in a centralized manner, preset information by which the mobile terminal is allowed to remotely control the washing machine is formed, and then it is determined whether real-time status information of the washing machine matches the preset information, so that safety of the remote control method is improved.

14 Claims, 12 Drawing Sheets

(51) Int. Cl.
    *D06F 34/28*     (2020.01)
    *D06F 37/42*     (2006.01)

(56) References Cited

OTHER PUBLICATIONS

Written Opinion (PCT/ISA/237) dated May 14, 2018, by the Chinese Patent Office as the International Searching Authority for International Application No. PCT/CN2018/076053.

* cited by examiner

REMOTE CONTROL METHOD FOR WASHING MACHINE

TECHNICAL FIELD

The present disclosure relates to the field of washing machines, and particularly relates to a remote control method for a washing machine.

BACKGROUND

Being a common household appliance in people's life, a washing machine brings great convenience to people's life. With increasing development of the society, people's requirement on life quality is becoming higher. Therefore, a control requirement on the washing machine is becoming more intelligent and humanized.

With the development of the Internet of Things technology, the Internet of Things technology has been changing our lifestyle and consumption habits. The development of an Internet-of-things washing machine is also quite rapid, and the application of the Internet-of-things washing system is unprecedentedly extensive. At present, the Internet-of-things washing machine can achieve remote control of the washing machine by using a computer, a mobile terminal and other sensing devices, and can further enable a user to query a working status of the washing machine in real time.

However, in the process of remote control, it is impossible to fully understand the conditions around the washing machine and the use of other people in the home, and then realize the remote control of the washing machine through the mobile terminal, there will be some hidden dangers, leading to safety accidents.

In view of this, the present disclosure is provided.

SUMMARY

The present disclosure aims to overcome a defect of the prior art, and provides a remote control method for a washing machine. The remote control method for a washing machine is mainly characterized in that when the washing machine is remotely controlled by the mobile terminal, corresponding state conditions are controlled in a centralized manner, preset information by which the mobile terminal is allowed to remotely control the washing machine is formed, and then it is determined whether real-time status information of the washing machine matches the preset information, so that safety of the remote control method is improved.

To achieve the foregoing objective, the present disclosure uses the following technical solution: in a remote control method for a washing machine, a washing machine and a mobile terminal in wireless connection with the washing machine are used, and the remote control method includes the following steps: establishing, between the mobile terminal and the washing machine, a control channel used to transmit a control instruction and a status feedback channel used to transmit a working status of the washing machine; obtaining status information of the washing machine; and when the status information does not match preset information by which the mobile terminal remotely controls the washing machine, cutting off the control channel, and maintaining the status feedback channel.

Further, the status information includes one or a combination of status information of each device of the washing machine, door body information, running status information of the washing machine, power grid information, and water supply information.

Preferentially, the status information of each device of the washing machine includes status information of a motor, and/or status information of a drying device.

Further, the remote control method includes the following steps:

S401: establishing a control channel and a status feedback channel that are between the mobile terminal and the washing machine;

S402: obtaining status information of the washing machine; and

S403: determining whether the status information matches the preset information by which the mobile terminal remotely controls the washing machine; and if yes, maintaining the control channel and the status feedback channel; and if not, cutting off the control channel, and maintain the status feedback channel.

Further, the step S401 of establishing a control channel and a status feedback channel that are between the mobile terminal and the washing machine includes the following steps:

S411: initiating an APP on a mobile terminal, and establishing the status feedback channel;

S412: sending, by the mobile terminal, a control request to the washing machine; and S413: determining whether an activation key disposed on the washing machine is activated; and if yes, performing a next step; and if not, indicating that remote control authorization fails.

Further, the step S403 of determining whether the status information matches the preset information by which the mobile terminal remotely controls the washing machine includes the following steps:

S431: detecting whether the door body of the washing machine is locked; and if not, cutting off the control channel, and maintaining the status feedback channel; and if yes, maintaining the control channel and the status feedback channel, and then performing S432; and S432: obtaining status information of a motor of the washing machine, and determining whether the motor of the washing machine runs normally; and if not, cutting off the control channel, and maintaining the status feedback channel; and if yes, maintaining the control channel and the status feedback channel, and then performing a next step.

Further, before step S432, or after it is determined in step S432 that the motor of the washing machine runs normally, the method further includes S433: obtaining status information of a drying device of the washing machine, and determining whether the drying device runs normally; and if not, cutting off the control channel, and maintaining the status feedback channel; and if yes, maintaining the control channel and the status feedback channel, and then performing the next step.

Further, after it is determined in step S403 that the status information matches the preset information by which the mobile terminal remotely controls the washing machine, the method further includes S404: obtaining a control instruction sent by the mobile terminal to the washing machine.

Further, after step S404, the method further includes S405: determining whether the control instruction matches the status information; and if yes, maintaining the control channel and the status feedback channel, and then performing a next step; and if not, cutting off the control channel, and maintain the status feedback channel.

Further, in step S405, the method includes the following steps:

S451: determining whether the control instruction is a washing program; and if yes, performing S452; and if not, performing a next step;

S452: obtaining water supply information, and determining whether a water supply is cut off; and if yes, cutting off the control channel, and maintaining the status feedback channel; and if not, maintaining the control channel and the status feedback channel, and then performing S453; and S453: obtaining power grid information, and determining whether the control instruction is an energy-saving mode; and if yes, obtaining a washing time corresponding to each washing phase of the washing program based on the power grid information; and if not, maintaining the control channel and the status feedback channel, and operating the washing program normally, wherein preferentially, the power grid information includes a step tariff and power consumption trend information.

Further, after the control channel is cut off in the remote control method, establishing a control channel between the mobile terminal and the washing machine again is not allowed.

After the foregoing technical solution is used, the present disclosure has the following beneficial effects when being compared with the prior art:

The remote control method in the present disclosure mainly aims to avoid such a case that when mobile terminal remotely controls the washing machine, the status information of the washing machine cannot be obtained accurately due to a too long distance, and consequently, the control instruction sent by the mobile terminal cannot be executed, or the mobile terminal operates the washing machine in error. Therefore, according to the remote control method in the present disclosure, when the washing machine that can be remotely operated by the mobile terminal is disposed, status conditions corresponding to the washing machine are centralized, and then preset information by which the mobile terminal remotely controls washing machine is formed accordingly. In addition, it is determined whether real-time status information of the washing machine matches the preset information, and if the real-time status information of the washing machine matches the preset information, the mobile terminal remotely controls the washing machine, so that safety of the remote control method is improved.

Figure 1:
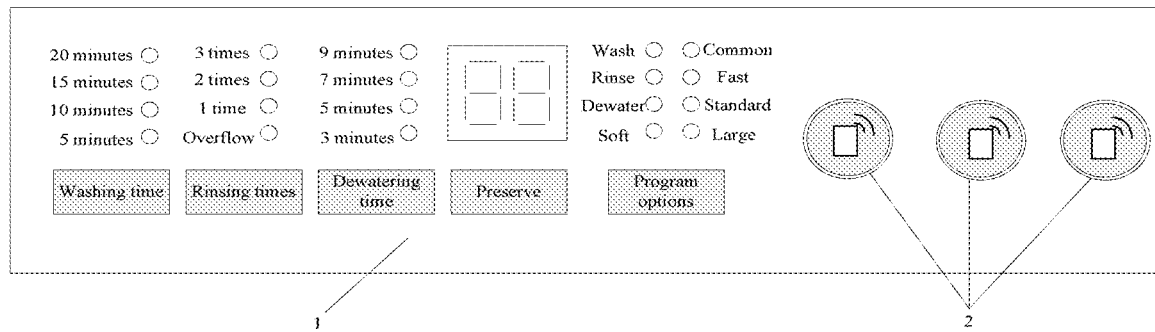
FIG. 1 is a structural diagram of an operation panel of a washing machine according to an embodiment of the present disclosure.
Figure 2:
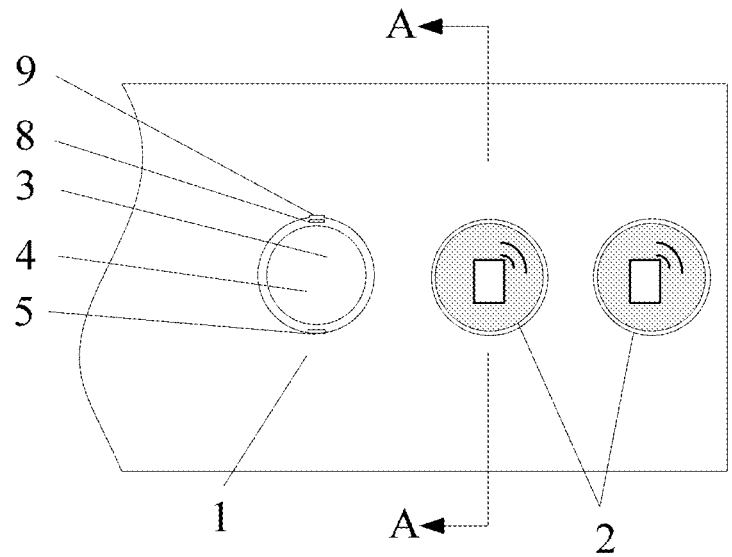
FIG. 2 is a partial structural diagram of an operation panel of a washing machine according to another embodiment of the present disclosure.
Figure 3:
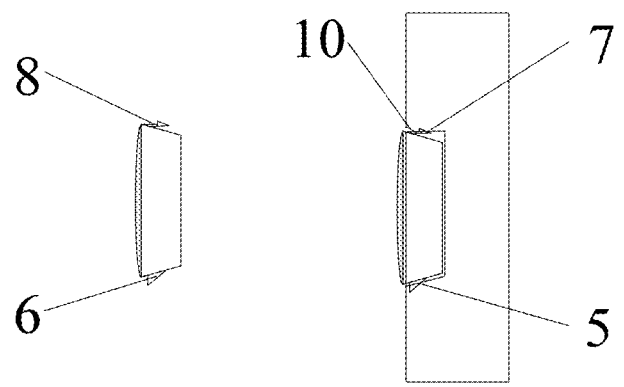
FIG. 3 is a cross section chart of A-A in FIG. 2.
Figure 4:
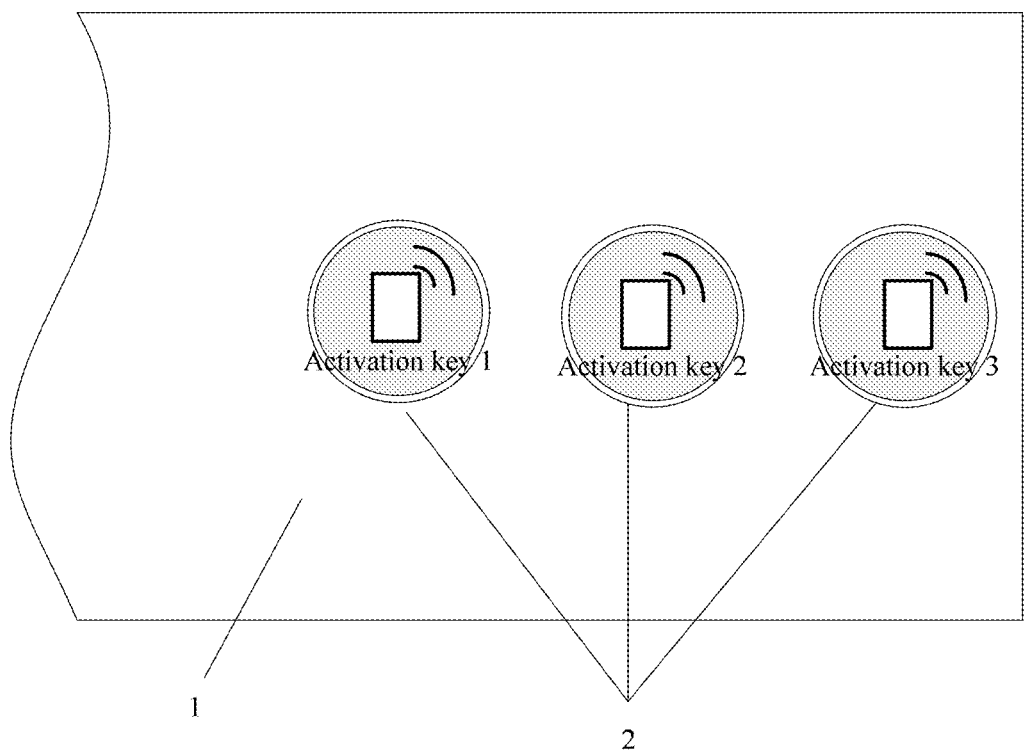
FIG. 4 is another partial structural diagram of an operation panel according to an embodiment of the present disclosure.

In the figures: 1: Operation panel; 2: Activation key; 3: Accommodating cavity; 4: Key slot; 5: First clamping hole; 6: First clamping jaw; 7: Second clamping hole; 8: Second clamping jaw; 9: Groove; 10: First bevel.

DETAILED DESCRIPTION

To make the foregoing objectives, features, and advantages of the present disclosure clearer and easier to understand, the present disclosure is further described in detail below with the accompanying drawings and specific implementations.

Embodiment 1

As shown in FIG. 1 to FIG. 4, the present disclosure provides a remote control system for a washing machine, a washing machine and an intelligent terminal are included, wherein a detachable activation device is disposed on the washing machine, and by using the activation device, the washing machine authorizes the intelligent terminal to remotely control the washing machine or prohibits the intelligent terminal from remotely controlling the washing machine.

In the present disclosure, the activation device is disposed on the washing machine, or is disposed within a range around the washing machine. When the washing machine needs to be remotely controlled, a person who controls the washing machine in advance can be authorized to remotely control the washing machine only when the person or another person is in front of or near the washing machine and triggers the activation device. In other words, to remotely control the washing machine, there should be a person near the washing machine to activate the activation device, so that safety check is performed before the washing machine is forced to be remotely controlled. Therefore, safety in remotely controlling the washing machine is improved.

In this embodiment, the activation device includes a near-field recognition unit. When the intelligent terminal is within the recognition range of the near-field recognition unit, the washing machine authorizes the intelligent terminal to remotely control the washing machine.

Specifically, the activation device includes an NFC card reader, and an NFC tag is disposed on the intelligent terminal. After the NFC tag is in a reading range of the NFC card reader, if the NFC card reader is in a triggered state, the washing machine authorizes the intelligent terminal to remotely control the washing machine. Certainly, in the present disclosure, the activation device is not limited to the NFC technology. Alternatively, an RFID card reader is disposed on the washing machine, and an RFID tag is disposed on the mobile terminal. A specific principle is the same as that described in the foregoing, and details are not described herein again. Certainly, the NFC card reader may alternatively be disposed on the washing machine.

Preferentially, a controller of the washing machine is communicatively connected to the NFC card reader, and the controller periodically detects a triggering unit. If the triggering unit is in a triggered state, the controller authorizes the intelligent terminal to remotely control the washing machine.

Preferentially, the activation device includes an activation key 2, the washing machine includes has a controller, the activation key 2 is connected to the controller in a wired or wireless manner, the activation key 2 includes a communication module configured to be communicatively connected to the controller and a detection module configured to detect whether the key is triggered. When the detection module detects that the activation key 2 is triggered, a signal is sent to the controller through the communication module. After receiving the signal, the controller authorizes the intelligent terminal to remotely control the washing machine.

In this embodiment, the washing machine includes a controller, the activation device includes an activation key 2 disposed on a box body of the washing machine, and the activation key 2 is communicatively connected to the controller of the washing machine. If the activation key 2 is triggered, the controller of the washing machine authorizes the intelligent terminal to remotely control the washing machine. In order to avoid misoperation such as misoperation by a child, a box body that can be opened and closed is disposed on the washing machine, and the activation key 2 may be placed in the box body, so as to effectively avoid child's misoperation. Further, the box body can be locked by a door lock.

Preferentially, the remote control system for a washing machine in the present disclosure further includes a cloud server. The cloud server is in network connection with the controller and the intelligent terminal, and is configured to receive washing information that is of the washing machine and that is sent by the controller, send the washing information to the intelligent terminal, receive control information sent by the intelligent terminal, and send the control information to the controller.

Preferentially, a first channel used by the intelligent terminal to receive status information of the washing machine and a second channel used by the washing machine to receive a control instruction sent by the intelligent terminal are established between the intelligent terminal and the controller of the washing machine. When the washing machine and the intelligent terminal are connected to a network separately, the first channel is in a connected state. When the activation device is in a triggered state, the second channel is in a connected state. When the activation device is in a frozen state, the second channel is in a closed state. It should be noted that, in the present disclosure, activation of the activation key 2 is implemented by pressing down the key, and freezing of the activation key 2 is also implemented by pressing down the key. When the activation key 2 is in an activated state, the activation key 2 changes into a frozen state by pressing down the key, and vice versa.

Preferentially, there are a plurality of intelligent terminals. The intelligent terminals are in network connection with the washing machine through the first channel separately. When a second channel between any intelligent terminal and the washing machine is through, the controller controls second channels between the other intelligent terminals and the washing machine to be in a closed state.

Preferentially, the activation key 2 is detachably disposed on the box body of the washing machine, a power supply module is also disposed in the activation key 2, the power supply module provides power required for signal transmission of the communication module, and the power supply module includes an energy conversion module and/or a built-in power supply.

The energy conversion module converts kinetic energy generated in a process of pressing the activation key 2 into electric energy and supplies the electric energy to the communication module.

Further, the washing machine further includes an operation panel disposed on the box body of the washing machine. An accommodating cavity is formed in the operation panel. The activation key 2 is detachably disposed in the accommodating cavity. Preferentially, the accommodating cavity includes a key slot and a connection part disposed at the internal periphery of the accommodating cavity. The activation key 2 is fixedly connected with the connection part.

Further, at least one clamping hole is formed in the connection part. A clamping jaw matching the clamping hole is disposed on the activation key 2. The clamping jaw is clamped into the clamping hole. The clamping hole prevents the activation key 2 from departing from the key slot.

Alternatively, the activation key 2 is fixed in the accommodating cavity through magnetic adsorption. When the activation key 2 is fixed in the accommodating cavity through magnetic adsorption, the activation key 2 is more convenient to take and place.

Preferentially, a power supply electrode is disposed in the accommodating cavity/key slot. Correspondingly, a charging electrode is disposed on the activation key 2. When the activation key 2 is placed in the key slot, the power supply electrode is in contact with the charging electrode, and the washing machine charges the activation key 2.

There is at least one activation key 2 in the present disclosure. Each activation key 2 may be configured to authorize a different intelligent terminal to control the washing machine.

For details about an assembly structure between the activation key 2 and the washing machine, refer to FIG. 1 to FIG. 4. At least one activation key 2 is detachably disposed on the main body of the washing machine.

Further, the washing machine further includes an operation panel 1 disposed on the main body of the washing machine. At least one accommodating cavity 3 is formed in the operation panel 1. At least one detachable activation key 2 is disposed in the accommodating cavity 3.

In this embodiment, the washing machine includes the operation panel 1. The operation panel 1 is provided with a display function area, a parameter adjustment area, and a function control area.

The display function area is used to display, in real time, specified washing parameters of the washing machine and washing parameters in a running process of the washing machine.

Parameter adjustment keys and corresponding washing parameters related to a washing program are disposed in the parameter adjustment area.

The activation key 2 is disposed in the function control area and controls the work of the washing machine.

In this embodiment, the function control area includes at least one activation key 2. At least one accommodating cavity 3 is formed in the operation panel 1. The detachable activation key 2 is disposed in the accommodating cavity 3. Alternatively, a plurality of accommodating cavities 3 are formed in the operation panel 1, and are uniformly distributed on the operation panel 1. In addition, there are a plurality of activation keys 2 corresponding to the accommodating cavities 3 respectively. Moreover, function names are printed on the activation keys 2, such as "activation key", to facilitate a user to control the work of the washing machine.

Therefore, in one aspect, the washing machine in this embodiment can prevent children from accidentally touching a key and consequently authorizing an improper intelligent terminal to control the washing machine, so as to prevent safety accidents.

In another aspect, the activation keys 2 can alternatively be disposed at other positions, to prevent other people from deliberately operating the activation keys 2 and consequently affecting washing of the washing machine.

Preferentially, the washing machine is further provided with a start/pause key and a child lock key. The keys are connected with the accommodating cavities 3 respectively and are detachable. The start/pause key is fixedly connected with the accommodating cavity 3.

More preferentially, only the child lock key and the activation key 2 of the washing machine are connected to the accommodating cavities 3 and are detachable.

Preferentially, after the activation key 2 is triggered, the controller of the washing machine does not authorize the mobile terminal to remotely control the washing machine. However, only after the child lock key is unlocked, can the activation key 2 be triggered to perform a reaction, that is, authorize a corresponding intelligent terminal to control the washing machine.

Further, the accommodating cavity 3 includes at least one key slot 4 matching the activation key 2 and a connection part disposed at the internal periphery of the accommodating cavity 3. The activation key 2 is connected to the connection part and is detachable.

Specifically, the key slot 4 matching the activation key 2 is formed in the accommodating cavity 3. For example, a plurality of key slots 4 are uniformly formed in the accommodating cavity 3. In addition, the key slot 4 corresponds to the connection part. Each key slot 4 has a corresponding connection part, to implement a connection to the activation key 2.

For example, when the activation key 2 is a column structure, the key slot 4 and accommodating cavity 3 are both column structures. The column structure includes a prism, a cylinder, a circular truncated cone, and the like.

Further, the activation key 2 is clamped to or in threaded connection with the connection part.

In this embodiment, the activation key 2 is a cylinder structure. A thread is formed in the side surface of the cylinder structure. In addition, the connection part is a thread that is formed in the internal periphery of the accommodating cavity 3 and that matches the activation key 2. A threaded connection between the activation key 2 and the connection part is formed.

Alternatively, the activation key 2 is clamped with the connection part. The activation key 2 is a circular truncated cone structure.

In addition, the accommodating cavity 3 is a cylinder structure matching the activation key 2.

Further, at least one clamping hole is formed in the connection part, and the activation key 2 is provided with a clamping jaw matching the clamping hole.

Specifically, a plurality of clamping holes may be formed in the connection part, and are uniformly formed in the accommodating cavity 3. In addition, the activation key 2 is a circular truncated cone structure. The clamping jaws are uniformly disposed on the side surface of the circular truncated cone structure.

For example, when four clamping holes are formed in the connection part, the clamping holes are uniformly formed in the internal periphery of the accommodating cavity 3, and an included angle between two adjacent clamping holes is 90 degrees. When three clamping holes are formed in the connection part, an included angle between two adjacent clamping holes is 120 degrees. When two clamping holes are formed in the connection part, an included angle between two adjacent clamping holes is 180 degrees.

Further, a first clamping hole 5 is formed in the connection part, and is disposed at the bottom at the internal periphery of the accommodating cavity 3. A first clamping jaw 6 matching the first clamping hole 5 is disposed at the bottom of the activation key 2.

Further, the first clamping jaw 6 is a clamping hook structure, a wedged structure, or a triangular structure.

Preferentially, the first clamping jaw 6 is a triangular structure

Specifically, the first clamping jaw 6 is disposed in the middle of the activation key 2. The first edge of the first clamping jaw 6 matches with a side surface of the activation key 2, and is disposed in an overlapping manner. In addition, the length of the first edge is ½ to ⅓ of the length of a waistline of a side surface of the activation key 2. The second edge of the first clamping jaw 6 is vertically disposed in front of the activation key 2, and is parallel to the bottom surface of the activation key 2. The length of the second edge is ¹⁄₁₀ to ¹⁄₁₅ of the length of the diameter of the bottom surface of the activation key 2. In addition, in this embodiment, the first clamping hole 5 is a groove structure. Preferentially, a second bevel is disposed in the groove structure in an internal direction of the accommodating cavity 3. Moreover, the second bevel matches the third edge of the first clamping jaw 6.

Further, a second clamping hole 7 is also formed in the connection part, and is disposed at the top at the internal periphery of the accommodating cavity 3. A second clamping jaw 8 matching the second clamping hole 7 is also disposed at the top of the activation key 2.

Preferentially, a groove 9 is formed in an edge of the second clamping hole 7.

More preferentially, at least one edge of the groove 9 is set to be a bevel.

Specifically, in this embodiment, a surface, facing the activation key 2, of the groove 9 is set to be a first bevel 10, and the first bevel 10 is smoothly connected to the accommodating cavity 3. In this embodiment, the disposed first bevel 10 can better facilitate dismounting of the activation key 2.

Further, the second clamping jaw 8 is an elastic component.

Preferentially, the second clamping jaw 8 includes an elastic connection part, and a clamping hook disposed at one end of the elastic connection part.

Specifically, the first bevel 10 is in contact with the middle of the elastic connection part of the second clamping jaw 8. The elastic connection part faces the first bevel 10, so that the activation key 2 can be more conveniently mounted into and dismounted from the accommodating cavity 3. For example, when a user exerts an acting force on the elastic connection part through the groove 9, the elastic connection part deforms elastically, and drives the clamping hook to move out of the second clamping hole. Then, the activation key 2 inclines outwards under an acting force in a direction far away from the accommodating cavity 3, and the activation key 2 is taken out of the accommodating cavity 3.

In conclusion, the washing machine in this embodiment prevents a case in which a child touches an activation key 2 by mistake and randomly authorizes an intelligent terminal to control and operate the washing machine, which causes a potential safety hazard of the washing machine. In this embodiment, a detachable activation key 2 is disposed on the operation panel 1 of the washing machine, and the activation key 2 is in wireless connection with the controller of the washing machine, so that a user can dispose the activation key 2 of the washing machine at a safe position, to implement a control function, and ensure safe running of the washing machine.

Further, a sticking part may also be disposed at the bottom of the activation key 2. The activation key 2 can be stuck at a high position by using the sticking part, so as to not only prevent a child from touching the activation key 2 and operating the activation key 2 in error, but also facilitate arrangement of the activation key 2. In addition, the activation key 2 can be placed at a position at which the user can control the activation key 2 conveniently.

Alternatively, a sensing unit is also disposed in the accommodating cavity 3. The sensing unit is connected to the controller of the washing machine. Only when the sensing unit in the accommodating cavity 3 senses an activation key 2, can the controller be triggered to send an authorization instruction corresponding to the activation key 2.

In conclusion, the remote control system for a washing machine in the present disclosure solves a problem in wireless communication between the activation key 2 and the controller of the washing machine. In the present disclosure, an energy conversion module is disposed in the activation key 2 to supply power to the communication module, thereby implementing separate arrangement of the activation key 2 and communication to the controller. Therefore, it can be ensured that the accommodating cavity 3 in the operation panel 1 of the washing machine is smooth, arrangement of a port is avoided, and it is ensured that the accommodating cavity 3 is safe and free of danger after the activation key 2 is removed. In addition, the activation key 2 can be arranged separately, so that a user can control the washing machine conveniently. This improves experience of the user.

Preferentially, the washing machine includes a display unit. The display unit is configured to output information about an intelligent terminal that communicates with the washing machine through the first channel. Specifically, the display unit displays, in real time, an account number, location information, and the like of each terminal that communicates with the washing machine through the first channel.

Preferentially, the display unit is further configured to output control information sent through the second channel. Specifically, the display unit displays, in real time, an account number of an APP corresponding to the intelligent terminal that controls the washing machine, and control instruction information that is sent by the intelligent terminal through the second channel.

Preferentially, the display unit is a display screen. The controller is connected to the display screen, and controls the display screen to display information about the intelligent terminal that communicates with the washing machine through the first channel.

Preferentially, the display screen is a touchscreen. The activation device includes the touchscreen, and is configured to receive an instruction that is input by a user to authorize/prohibit any intelligent terminal to remotely control/from remotely controlling the washing machine. In this solution, a plurality of intelligent terminals can all be networked, so as to be connected to the washing machine through the first channel. The intelligent terminal displays washing status information of the washing machine in real time. However, when the intelligent terminal needs to remotely control the washing machine, application information needs to be transmitted through the first channel, and the display screen can display the application information. To obtain authorization from the washing machine, confirmation on the display screen needs to be clicked by a person. When a plurality of people apply for remotely controlling the washing machine at the same time within a time range, an icon that is on the display screen and that corresponds to a preauthorized intelligent terminal needs to be clicked by a person.

Certainly, in the present disclosure, the activation device may be an NFC card reader, an activation key 2, a touchscreen, or any combination thereof. Preferentially, in the present disclosure, the activation device includes the activation key 2, the NFC card reader disposed on the washing machine or disposed on the activation key 2, and the touchscreen, thereby increasing authorization manners, being compatible with various intelligent terminals, and increasing authorizing manners of an Internet-of-things washing machine. For example, if the intelligent terminals are mobile phones, when NFC tags are disposed on some of the mobile phones, authorization can be implemented in a mobile phone swiping manner; or when no NFC tag is disposed on the mobile phones, authorization may be implemented by triggering the activation key 2 or clicking on the touchscreen. Alternatively, when the intelligent terminals are remote computers, authorization cannot be implemented through the NFC technology, and authorization may be implemented by triggering the activation key 2 or clicking on the touchscreen.

In this embodiment, the activation key 2 includes a key body and a key detection circuit. The key detection circuit detects a key pressing signal in real time, detects whether the key is pressed down and/or detects a period in which the key is pressed down, and sends the detection result to the controller. The controller performs corresponding controlling based on the detection result.

Preferentially, the detection circuit is configured to detect whether the key is pressed down, and send a detection result to the controller. The controller controls on/off of the second channel based on the detection result. For example, when the detection circuit detects that the key is pressed down, the controller controls the second channel to be through; and when the detection circuit detects that the key is pressed down again, the controller controls the second channel to be cut off.

Alternatively, the detection circuit is configured to detect whether a time period in which the activation key 2 is pressed down exceeds a specified time period, and sends a detection result to the controller. The controller controls on/off of the second channel based on the detection result.

Alternatively, the detection circuit is configured to detect a quantity of times by which the activation key 2 is pressed down in a specified time range. The controller controls, according to the quantity of times, a second channel between a different intelligent terminal and the washing machine to open. In this solution, the controller determines which intelligent terminal is authorized according to the quantity of times by which the activation key 2 is pressed down.

Embodiment 2

Figure 5:
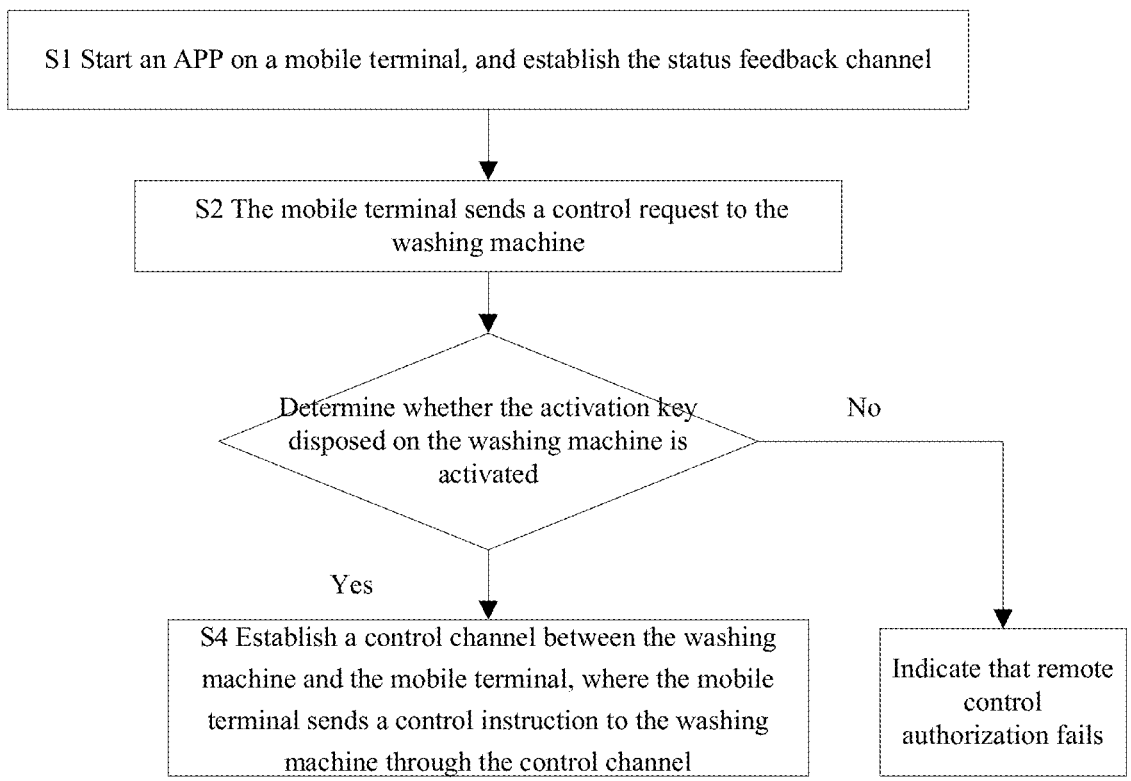
FIG. 5 is a flowchart of a remote control method according to an embodiment of the present disclosure.
Figure 6:
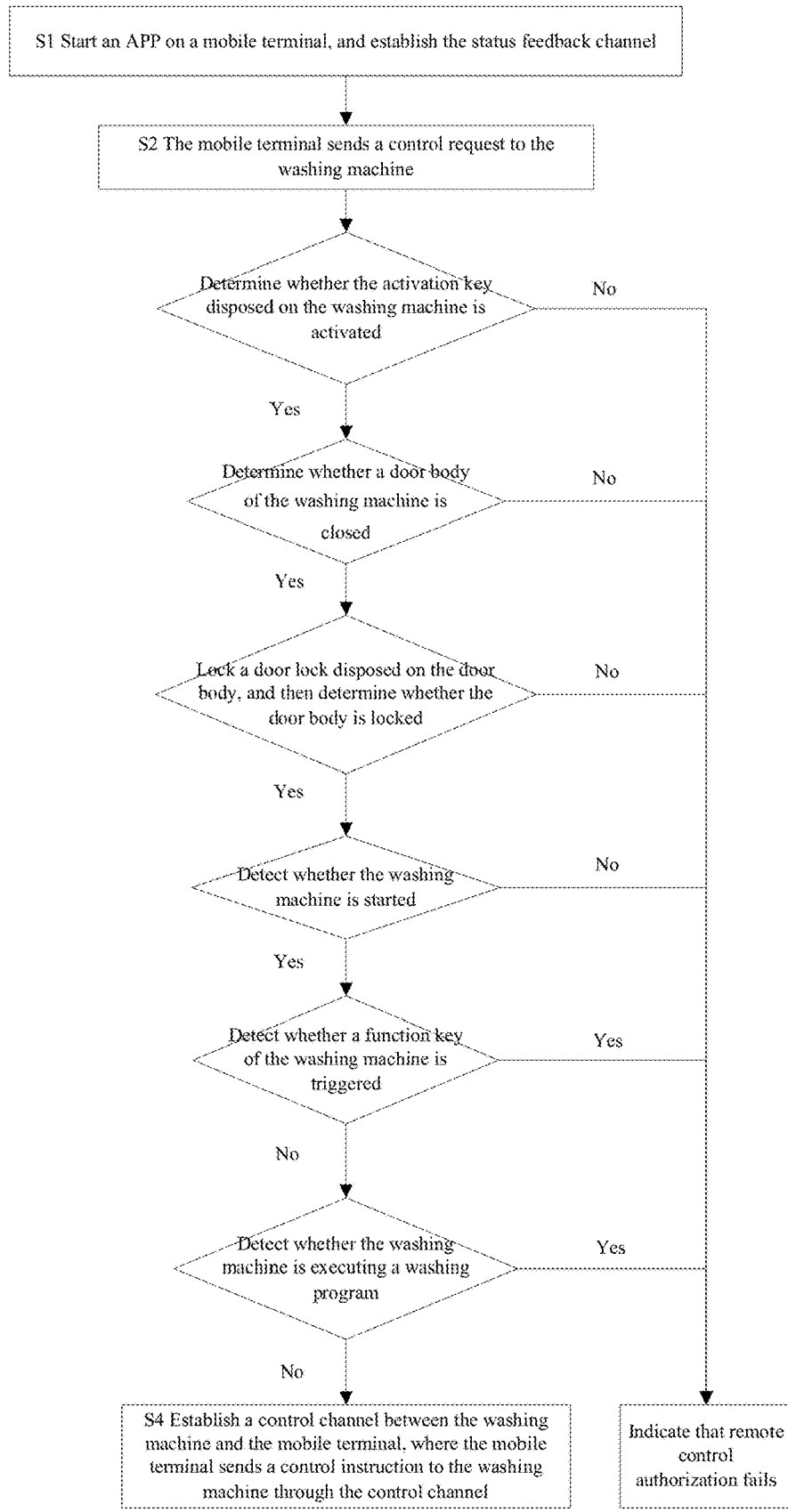
FIG. 6 is a flowchart of a remote control method according to another embodiment of the present disclosure.

As shown in FIG. 5 and FIG. 6, the present disclosure further provides a remote control method for a washing machine, characterized in that a washing machine and a mobile terminal in wireless connection with the washing machine are used, and the remote control method includes the following steps: a status feedback channel that is between the washing machine and the mobile terminal and that is configured to transmit a working status of the washing machine is established; a control request sent by the mobile terminal is received by the washing machine; and after an activation key 2 disposed on the washing machine is activated, a control channel that is between the washing machine and the mobile terminal and that is configured to transmit a control instruction is established.

Specifically, in this embodiment, the remote control method for a washing machine mainly aims to ensure running safety when the washing machine is remotely controlled by the mobile terminal, and avoid safety accidents (for example, when a child plays in the washing machine, the washing machine is remotely controlled to execute the washing program) caused when a running status or an ambient environment condition of the washing machine cannot be observed and the mobile terminal is used rashly to control the washing machine to execute a washing program. In this embodiment, according to the remote control method, the status feedback channel that is between the washing machine and the mobile terminal and that is configured to transmit a working status of the washing machine is established, so that status information of the washing machine is obtained on the mobile terminal in real time. Then, the control channel that is between the washing machine and the mobile terminal and that is configured to transmit a control instruction can be established only when a person who controls the washing machine in advance pre-ensures that the washing machine is in a safe state or another person ensures that the washing machine is in a safe state, thereby implementing remote control of the washing machine. In this embodiment, the remote control method improves the running safety of the washing machine, and avoids safety accidents.

The activation device is disposed on the washing machine or in a range around the washing machine. If the washing machine needs to be remotely controlled, the control channel between the washing machine and the mobile terminal can be established only when the person who controls the washing machine in advance or another person is in front of or near the washing machine and triggers the activation device. Then, the control instruction can be sent to the washing machine through the control channel to achieve remote control. In other words, to remotely control the washing machine, there should be a person near the washing machine to activate the activation device, so that safety check is performed before the washing machine is forced to be remotely controlled. Therefore, safety in remotely controlling the washing machine is improved.

Further, it is determined, by pressing the activation key 2 and inputting activation information in the remote control method and based on the activation information, that the activation key 2 is activated.

Alternatively, a near-field sensing module disposed on the activation key 2 performs near-field sensing with the mobile terminal, so as to obtain the activation information, and determine, based on the activation information, that the activation key 2 is activated.

Specifically, in this embodiment, the washing machine includes a controller. The activation key 2 is connected to the controller in a wired or wireless manner. The activation key 2 includes a communication module configured to communicatively connect to the controller and a detection module configured to detect whether the key is triggered. When the detection module detects that the activation key 2 is triggered, a signal is sent to the controller by using the communication module. After receiving the signal, the controller authorizes the intelligent terminal to remotely control the washing machine.

The activation information is input to the washing machine by using the detection module, and determines, based on the activation information, that the activation key 2 is activated.

Further, the remote control method includes the following steps:

S1: an APP on a mobile terminal is initiated, and the status feedback channel is established.

S2: a control request is sent to the washing machine by the mobile terminal.

S3: whether the activation key 2 disposed on the washing machine is activated is determined; and if yes, a next step is performed; and if not, it is indicated that remote control authorization fails.

S4: the control channel is established, wherein the mobile terminal sends a control instruction to the washing machine through the control channel.

Further, after an APP on the mobile terminal is initiated in step S1, the mobile terminal matches a corresponding washing machine, and establishes a status feedback channel between the washing machine and the mobile terminal.

Specifically, in this embodiment, safety in controlling the washing machine by the mobile terminal is ensured, a mobile terminal of a user who does not use the washing machine is prevented from obtaining information about the washing machine and controlling the washing machine.

Further, between step S2 and step S3, or after the activation key 2 disposed on the washing machine is activated in step S3, the method further includes step A): whether a door body of the washing machine is closed is determined; and if yes, a next step is performed; and if not, it is indicated that remote control authorization fails.

Specifically, in the remote control method in this embodiment, the control channel can be established only when the door body of the washing machine is closed. In one aspect, it can be ensured that the control instruction can be executed normally in a process in which the mobile terminal remotely controls the washing machine. In another aspect, the remote control method can ensure that the door body is in a closed state when the mobile terminal performs remote control, thereby ensuring running safety of the washing machine.

Further, after the door body is closed in step A), the method further includes step B): a door lock disposed on the door body is locked, and then whether the door body is locked is determined; and if yes, a next step is performed; and if not, it is indicated that remote control authorization fails.

Further, between step S2 and step S3, or after the activation key 2 disposed on the washing machine is activated in step S3, or after step B), the method further includes step C): whether the washing machine is turned on is detected; and if yes, a next step is performed; and if not, it is indicated that remote control authorization fails.

Specifically, in the remote control method in this embodiment, it is detected whether the door body of the washing machine is in a closed state. The washing machine can be remotely controlled by the mobile terminal successfully only if the door body of the washing machine is in a closed state. For example, a remote control start state is displayed on an operation interface of the washing machine. The washing machine may further indicate that the control channel is successfully opened to the mobile terminal through remote control. If the door body of the washing machine is in an open state, information that the door body of the washing machine is not closed and information indicating that remote control authorization fails are fed back to the mobile terminal through the status feedback channel. Information instructing a user to close the door body may also be sent through the status feedback channel.

Further, after the washing machine is turned on in step C), the method further includes step D): whether a function key of the washing machine is triggered is detected; and if the function key is not triggered, a next step is performed; and if the function key is triggered, it is indicated that remote control authorization fails.

Specifically, in the control method in this embodiment, if it is determined, by detecting whether a function key of the washing machine is triggered, that the washing machine is an operated state, the mobile terminal is prohibited from remotely controlling the washing machine. In other words, a priority of locally direct control of the washing machine is higher than that of remote control of the mobile terminal. Further, operation safety of the washing machine is improved.

Further, after the washing machine is started in step C), or after step D), the method further includes step E): whether the washing machine is executing a washing program is detected; and if yes, it is indicated that remote control authorization fails; and if not, S4 is performed.

Specifically, in this embodiment, whether the washing machine is suitable to be remotely controlled by the mobile terminal is determined by detecting whether the washing machine is executing a washing program, so that the washing machine can complete a corresponding washing program, thereby ensuring the running safety of the washing machine.

Further, after the control channel is established in step S4, the door body of the washing machine is locked.

Specifically, after the control channel that is configured to transmit a control instruction and that is between the mobile terminal and washing machine is established in step S4 in this embodiment, the door body of the washing machine is locked, so as to ensure that when the washing machine is remotely controlled by the mobile terminal, a scouring barrel of the washing machine is in a sealed state. Therefore, a case that the running is unsafe when a person opens the door body of the washing machine in error is avoided, and running safety of the washing machine in a remote control phase is controlled.

In this embodiment, the remote control method includes the following steps:

S1: an APP on a mobile terminal is initiated, and the status feedback channel is established.

S2: a control request is sent to the washing machine by the mobile terminal.

S3: whether the activation key 2 disposed on the washing machine is activated is determined; and if yes, A) is performed; and if not, it is indicated that remote control authorization fails.

A): whether a door body of the washing machine is closed is determined; and if yes, B) is performed; and if not, it is indicated that remote control authorization fails.

B): a door lock disposed on the door body is locked, and then whether the door body is locked is determined; and if yes, C) is performed; and if not, it is indicated that remote control authorization fails.

C): whether the washing machine is turned on is detected; and if yes, D) is performed; and if not, it is indicated that remote control authorization fails.

D): whether a function key of the washing machine is triggered is detected; and if not, E) is performed; and if yes, it is indicated that remote control authorization fails.

E): whether the washing machine is executing a washing program is detected; and if yes, it is indicated that remote control authorization fails; and if not, S4 is performed.

S4: the control channel is established and the door body of the washing machine is locked, wherein the mobile terminal sends a control instruction to the washing machine through the control channel.

Embodiment 3

Figure 7:
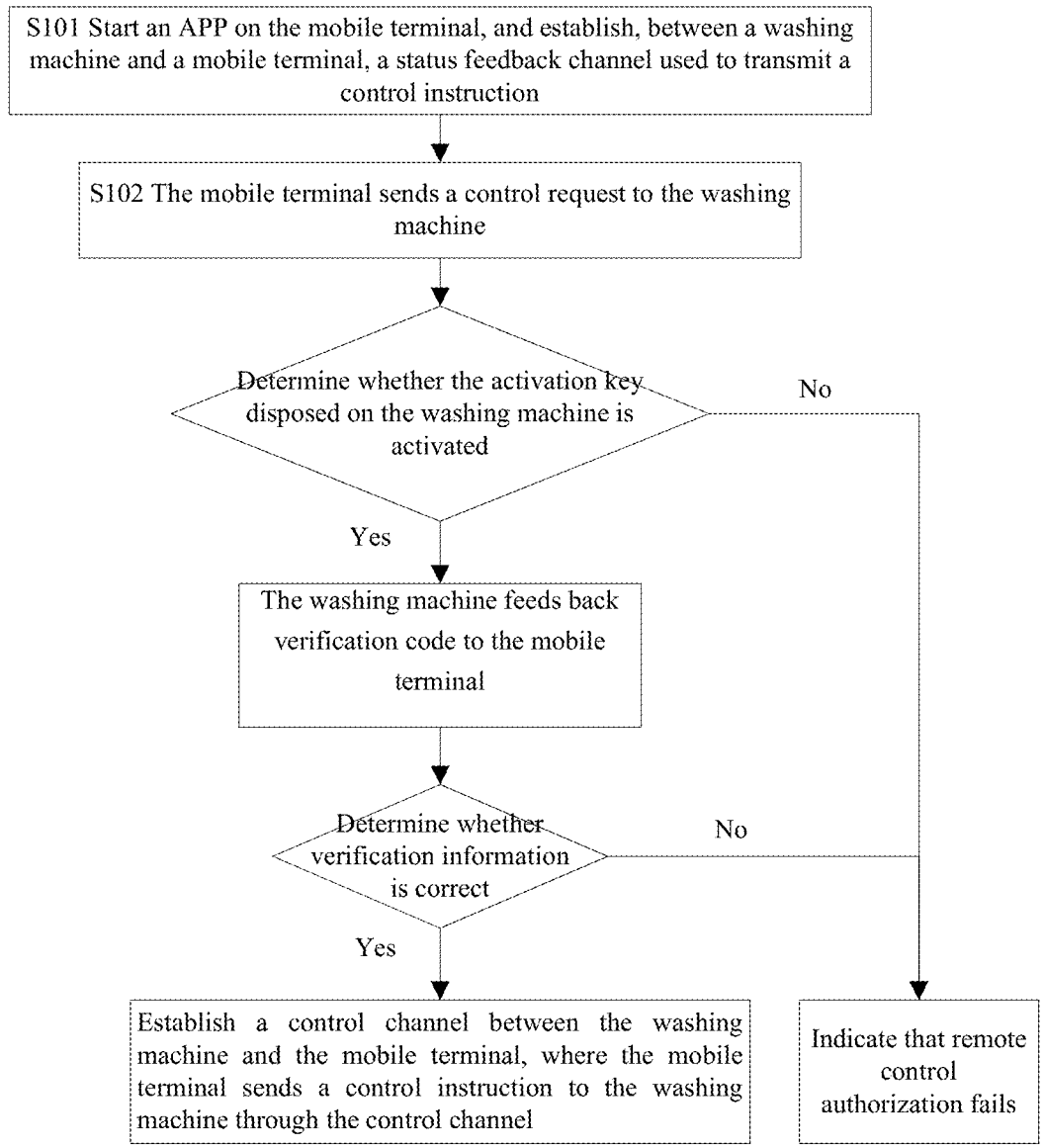
FIG. 7 is a flowchart of a remote control method according to another embodiment of the present disclosure.
Figure 8:
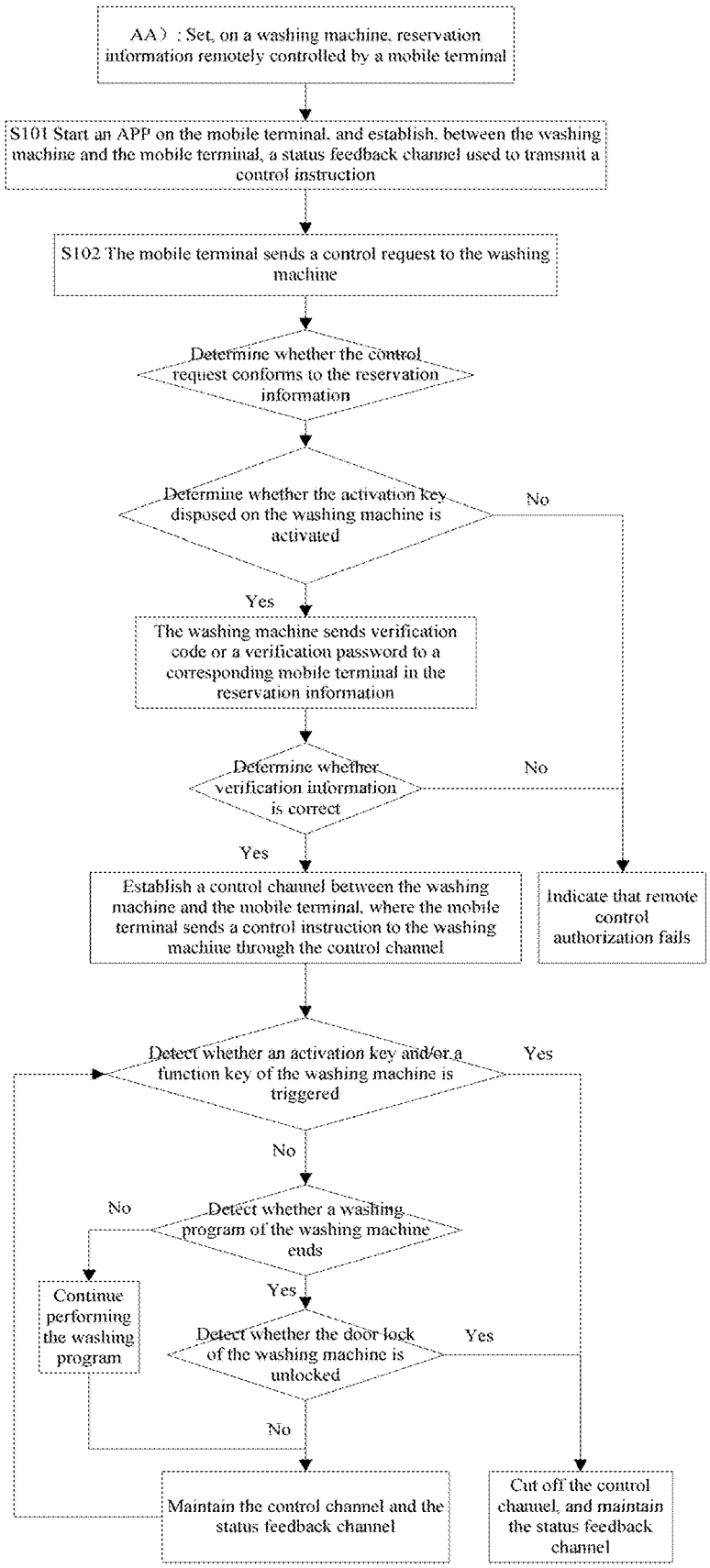
FIG. 8 is a flowchart of a remote control method according to another embodiment of the present disclosure.

As shown in FIG. 7 and FIG. 8, the present disclosure further provides a remote control method for a washing machine, characterized in that a washing machine and a mobile terminal in wireless connection with the washing machine are used, and the remote control method includes the following steps: a status feedback channel that is between the washing machine and the mobile terminal and that is configured to transmit a control instruction is established; a control request sent by the mobile terminal is received by the washing machine; after an activation key 2 disposed on the washing machine is activated, verification information is fed back to the mobile terminal; and after the verification information passes verification, a control channel that is configured to transmit a working status of the washing machine and that is between the washing machine and the mobile terminal is established.

Specifically, in this embodiment, the remote control method for a washing machine mainly aims to ensure running safety when the washing machine is remotely controlled by the mobile terminal, and avoid safety accidents (for example, when a child plays inside the washing machine, the washing machine is remotely controlled to execute the washing program) caused when a running status or an ambient environment condition of the washing machine cannot be observed and the mobile terminal is used rashly to control the washing machine to execute a washing program. In this embodiment, according to the remote control method, the status feedback channel that is between the washing machine and the mobile terminal and that is configured to transmit a working status of the washing machine is established, so as to feed back status information of the washing machine to the mobile terminal in real time. Firstly, a person who controls the washing machine in advance needs to pre-ensure that the washing machine is in a safe state or another person needs to ensure that the washing machine is in a safe state. Then, the mobile terminal can establish the control channel that is configured to transmit a control instruction and that is between the washing machine and the mobile terminal only after the verification information passes verification. Therefore, duplicate protection on remote control of the washing machine is implemented, running safety of the washing machine is improved, and safety accidents are avoided.

Further, in the remote control method, the washing machine feeds back verification information to the mobile terminal.

Alternatively, a cloud server that is separately connected to the washing machine and the mobile terminal feeds back verification information to the mobile terminal.

Further, the verification information includes one or any combination of model information of the washing machine, user information, verification code, or verification password.

Preferentially, the verification code is randomly generated by the washing machine/cloud server, or preset by a user.

Alternatively, the verification password is randomly generated by the washing machine/cloud server, or preset by a user.

Specifically, in this embodiment, according to the remote control method, the washing machine feeds back preset verification information or randomly generated verification information to the mobile terminal. The control channel that is configured to transmit a control instruction and that is between the washing machine and the mobile terminal can be established only after the verification information passes verification.

Alternatively, according to the remote control method, the cloud server feeds back preset verification information or randomly generated verification information to the mobile terminal. The control channel that is configured to transmit a control instruction and that is between the washing machine and the mobile terminal can be established only after the verification information passes verification.

In this embodiment, verification information is mainly used to achieve a two-factor authentication manner, to further ensure safety in remotely controlling the washing machine by the mobile terminal. For example, a person different from a family member is prevented from controlling a washing machine in a family by using a mobile terminal.

Further, the remote control method includes the following steps:

S101: an APP on the mobile terminal is initiated, and between the washing machine and the mobile terminal, a status feedback channel used to transmit a control instruction is established.

S102: a control request is sent to the washing machine by the mobile terminal.

S103: whether the activation key 2 disposed on the washing machine is activated is determined; and if yes, the washing machine feeds back verification code to the mobile terminal, and then performs a next step; and if not, it is indicated that remote control authorization fails.

S104: whether verification information is correct is determined; and if yes, a control channel between the washing machine and the mobile terminal is established, wherein the mobile terminal sends a control instruction to the washing machine through the control channel; and if not, it is indicated that remote control authorization fails.

Further, it is determined, by pressing the activation key 2 and inputting activation information in the remote control method and based on the activation information, that the activation key 2 is activated.

Alternatively, a near-field sensing module disposed on the activation key 2 performs near-field sensing with the mobile terminal, so as to obtain the activation information, and determine, based on the activation information, that the activation key 2 is activated.

Specifically, in this embodiment, the washing machine includes a controller. The activation key 2 is connected to the controller in a wired or wireless manner. The activation key 2 includes a communication module configured to communicatively connect to the controller and a detection module configured to detect whether the key is triggered. When the detection module detects that the activation key 2 is triggered, a signal is sent to the controller by using the communication module. After receiving the signal, the controller authorizes the intelligent terminal to remotely control the washing machine.

The detection module that controls the key detects activation information that is input by a user by using the activation key 2 to determine whether the activation key 2 is in an activated state, and then performs a next step.

Alternatively, the activation device includes a near-field recognition unit. When the intelligent terminal is within the recognition range of the near-field recognition unit, the washing machine authorizes the intelligent terminal to remotely control the washing machine. The near-field recognition unit of the activation key 2 performs near-field communication with the mobile terminal, obtains activation information to determine whether the activation key 2 is in an activated state, and then performs a next step.

In this embodiment, a user can use the mobile terminal to remotely control the washing machine only after a person who controls the washing machine in advance or another person pre-ensures that the washing machine is in a safe state, so that the remote control method for a washing machine has a better safety performance.

Further, before step S101, or between step S101 and step S102, the method further includes step AA): reservation information remotely controlled by a mobile terminal is set on a washing machine.

The reservation information includes one or any combination of a control request validity time, mobile terminal information, verification code, or verification password.

Further, between step S102 and step S103, or after it is determined in step S103 that the activation key 2 disposed on the washing machine is activated, the method further includes step BB): whether the control request conforms to the reservation information is determined; and if yes, a next step is performed; and if not, it is indicated that remote control authorization fails.

Specifically, according to the remote control method in this embodiment for a washing machine, a person who controls the washing machine in advance can set reservation information for remote control on the washing machine in advance, and compares the control request with the reservation information, determines whether the reservation information conforms to reserved remote control. For example, a mobile terminal corresponding to a user XXX will perform remote control on the washing machine between 12 AM to 5 PM, and verification code is XXXX. When the mobile terminal corresponding to the user XXX sends a control request to the washing machine at 3 PM, and the preset verification code XXXX is correspondingly input, the control channel is established. When the mobile terminal corresponding to the user XXX sends a control request at 10 AM, because it does not conform to the reservation information, the control channel cannot be established, and it is indicated that remote control authorization fails. Therefore, protection in a reservation mode is added to remote control of the washing machine, which improves the running safety of the washing machine.

Further, after it is determined in step S103 that the activation key 2 is activated, the washing machine sends verification code or a verification password to a corresponding mobile terminal in the reservation information.

Alternatively, after it is determined in step BB) that the control request conforms to the reservation information, the washing machine sends verification code or a verification password to a corresponding mobile terminal in the reservation information.

Specifically, the verification code or verification password in this embodiment is verification code or verification password that is preset in the reservation information by a user.

Further, after the control channel between the washing machine and the mobile terminal is established in step S104, the method further includes the following steps:

S111: whether the activation key 2 and/or a function key of the washing machine are/is triggered is detected; and if yes, the control channel is cut off, and the status feedback channel is maintained; and if not, a next step is performed.

S112: whether the door lock of the washing machine is unlocked is detected; and if yes, the control channel is cut off, and the status feedback channel is maintained; and if not, the control channel and the status feedback channel are maintained, and then S111 is performed.

Further, between step S111 and step S112, the method further includes step CC): whether a cloth washing program of the washing machine ends is detected; and if yes, a next step is performed; and if not, the cloth washing program is continuously executed, and then S111 is performed.

Alternatively, after it is detected in step S203 that a door lock of a door body of the washing machine is unlocked, the method further includes step CC'): whether a cloth washing program of the washing machine ends is detected; and if yes, a next step is performed; and if not, the cloth washing program is continuously executed, and then S111 is performed.

In this embodiment, the remote control method for a washing machine includes the following steps:

AA): reservation information remotely controlled by a mobile terminal is set on a washing machine.

S101. an APP on the mobile terminal is initiated, and a status feedback channel that is configured to transmit a control instruction and that is between the washing machine and the mobile terminal is established.

S102: a control request is sent to the washing machine by the mobile terminal.

BB): whether the control request conforms to the reservation information is determined; and if yes, S103 is performed; and if not, it is indicated that remote control authorization fails.

S103: whether the activation key 2 disposed on the washing machine is activated is determined; and if yes, the washing machine sends verification code or a verification password to a corresponding mobile terminal in the reservation information, and then a next step is performed; and if not, it is indicated that remote control authorization fails.

S104: whether verification information is correct is determined; and if yes, a control channel between the washing machine and the mobile terminal is established, wherein the mobile terminal sends a control instruction to the washing machine through the control channel; and if not, it is indicated that remote control authorization fails.

S111: whether the activation key 2 and/or a function key of the washing machine are/is triggered is determined; and if yes, the control channel is cut off, and the status feedback channel is maintained; and if not, CC) is performed.

CC): whether a cloth washing program of the washing machine ends is detected; and if yes, a next step is performed; and if not, the cloth washing program is continuously executed, the control channel and the status feedback channel are maintained, and then S111 is performed.

S112: whether the door lock of the washing machine is unlocked is detected; and if yes, the control channel is cut off, and the status feedback channel is maintained; and if not, the control channel and the status feedback channel are maintained, and then S111 is performed.

Embodiment 4

Figure 9:
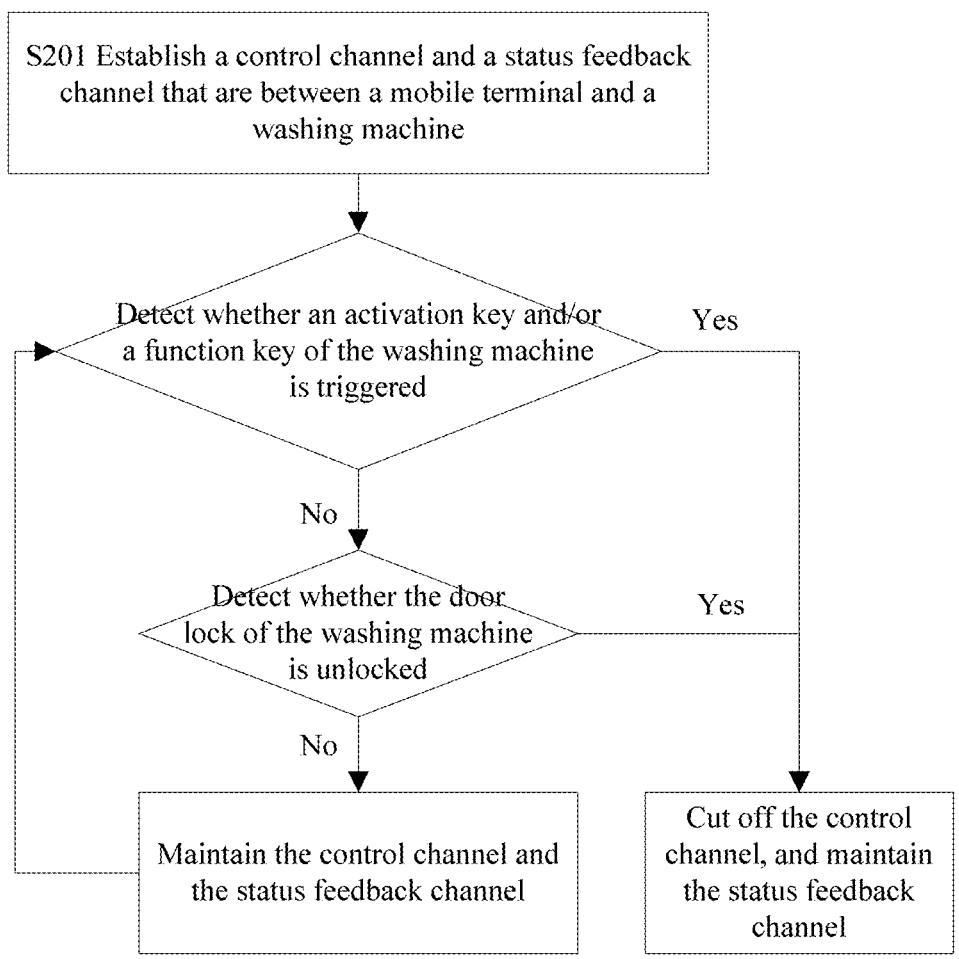
FIG. 9 is a flowchart of a remote control method according to another embodiment of the present disclosure.
Figure 10:
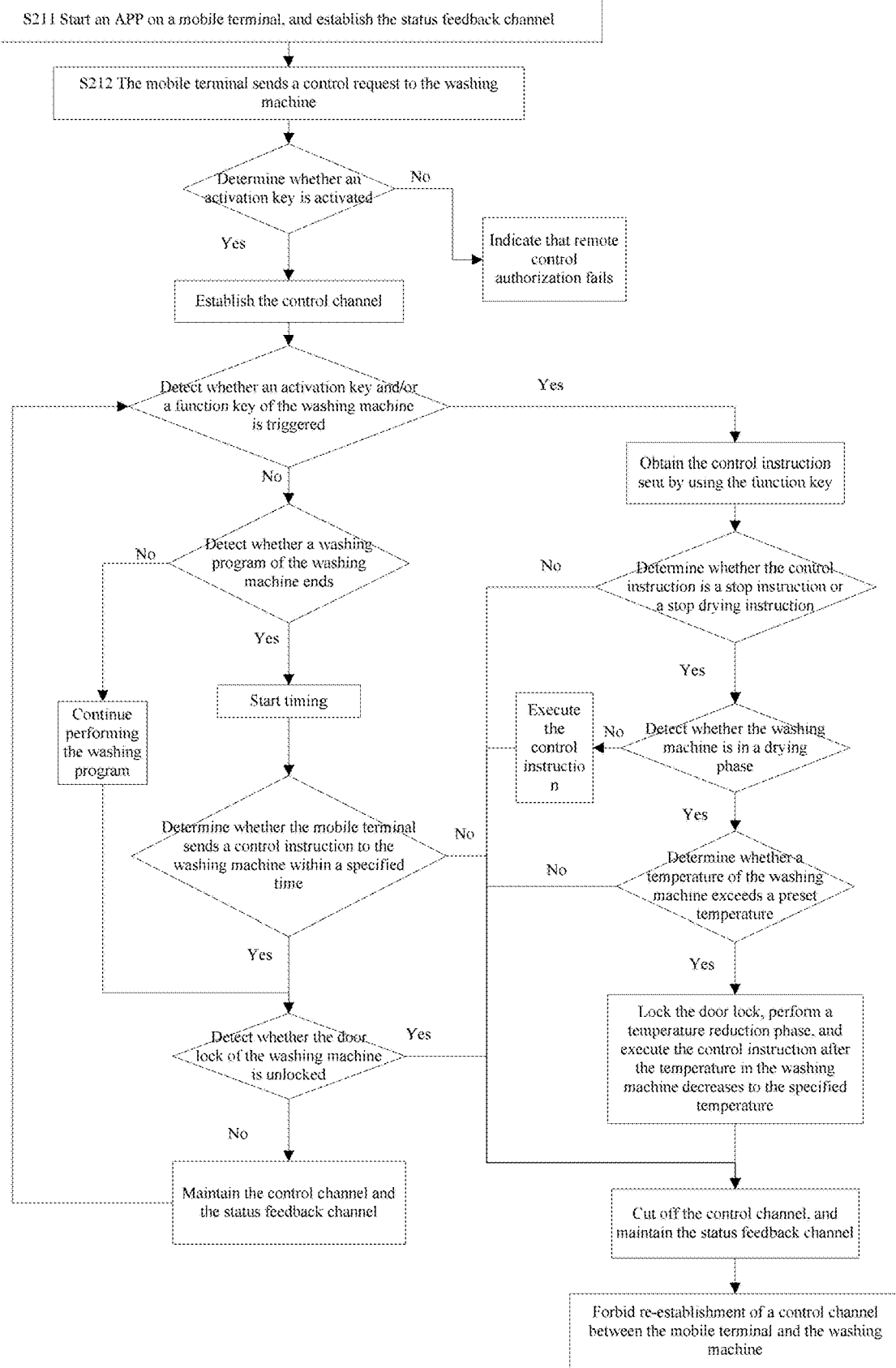
FIG. 10 is a flowchart of a remote control method according to another embodiment of the present disclosure.

As shown in FIG. 9 and FIG. 10, the present disclosure further provides a remote control method for a washing machine, characterized in that a washing machine and a mobile terminal in wireless connection with the washing machine are used, and the remote control method includes the following steps: between the mobile terminal and the washing machine, a control channel configured to transmit a control instruction and a status feedback channel configured to transmit a working status of the washing machine are established; whether the washing machine is triggered is detected; and if yes, the control channel is cut off, and the status feedback channel is maintained; and if not, the control channel and the status feedback channel are maintained.

Specifically, in this embodiment, the remote control method for a washing machine is mainly characterized in that when the mobile terminal remotely controls the washing machine, after triggering operation is directly performed on the washing machine, the control channel is cut off, that is, remote control of the mobile terminal is cut off, and only a user near the washing machine controls and operates the washing machine. Therefore, it is ensured that remote control of the mobile terminal is cut off as soon as an environment of the washing machine changes, which ensures the running safety of the washing machine.

Further, the triggering the washing machine includes triggering one or any combination of an activation key 2 that is configured to authorize the mobile terminal to send a control instruction to the washing machine and that is disposed on the washing machine, a function key disposed on the washing machine, or a door lock of the washing machine.

Specifically, in this embodiment, the remote control method for a washing machine can actively cut off the control channel by triggering the activation key 2.

Alternatively, after a user triggers the function key of the washing machine or the door lock to directly operate and control the washing machine, the control channel is cut off passively. In this embodiment, it is ensured, in the foregoing manner, the remote control method can cut off remote control of the mobile terminal in time. Therefore, remote control can be performed only when the washing machine is in a safe state. Once a state of the washing machine changes and whether the washing machine is in a safe state cannot be distinguished, remote control of the mobile terminal is cut off to ensure safe running of the washing machine.

Further, the remote control method includes the following steps:

S201. a control channel and a status feedback channel that are between the mobile terminal and the washing machine are established.

S202. whether the activation key 2 and/or a function key of the washing machine are/is triggered is detected; and if yes, the control channel is cut off, and the status feedback channel is maintained; and if not, a next step is performed.

S203. whether the door lock of the washing machine is unlocked is detected; and if yes, the control channel is cut off, and the status feedback channel is maintained; and if not, the control channel and the status feedback channel are maintained, and then S202 is performed.

Further, the step S201 of establishing a control channel and a status feedback channel that are between the mobile terminal and the washing machine includes the following steps:

S211. an APP on a mobile terminal is initiated, and the status feedback channel is established.

S212. a control request is sent to the washing machine by the mobile terminal.

S213. whether the activation key 2 is activated is determined; and if yes, a next step is performed; and if not, it is indicated that remote control authorization fails.

Further, between step S202 and step S203, the method further includes step AAA): whether a cloth washing program of the washing machine ends is detected; and if yes, a next step is performed; and if not, the cloth washing program is continuously executed, and then S203 is performed.

Alternatively, after it is detected in step S203 that a door lock of a door body of the washing machine is unlocked, the method further includes step AAA'): whether a cloth washing program of the washing machine ends is detected; and if yes, a next step is performed; and if not, the cloth washing program is continuously executed, and then S202 is performed.

Specifically, in this embodiment, the remote control method for a washing machine can ensure normal running of the cloth washing program executed during remote control of the mobile terminal, thereby improving the running safety of the washing machine.

Further, after the cloth washing program of the washing machine ends, the method further includes step BBB): timing is started; whether the mobile terminal sends a control instruction to the washing machine within a specified time is determined; and if not, the control channel is cut off, and the status feedback channel is maintained; and if yes, S203 is performed.

Specifically, according to the remote control method for a washing machine in this embodiment, the washing machine can be used sufficiently, to avoid a case that because a mobile terminal occupies a washing machine in a long period in which the mobile terminal does not use the washing machine, the washing machine cannot be used.

Further, after it is detected in step S202 that the function key of the washing machine is triggered, the method further includes step CCC): the control instruction sent by using the function key is received; whether the control instruction is a stop instruction or a stop drying instruction is determined; and if yes, a next step is performed; and if not, the control channel between the mobile terminal and the washing machine is cut off, and the status feedback channel is maintained.

Further, after it is determined in step CCC) that the control instruction is the stop instruction or the stop drying instruction, the method further includes step DDD): whether the washing machine is in a drying phase is detected; and if yes, a next step is performed; and if not, the control channel is cut off, the status feedback channel is maintained, and then the control instruction is performed.

Further, after it is detected in step DDD) that the washing machine is in the drying phase, the further includes step EEE): whether a temperature of the washing machine exceeds a preset temperature is detected; and if yes, the door lock is locked, a temperature reduction phase is performed, the control instruction is executed after the temperature in the washing machine decreases to the specified temperature, then the control channel is cut off, and the status feedback channel is maintained; and if not, the control channel is cut off, and the status feedback channel is maintained.

Preferentially, a range of the preset temperature is 40° C. to 70° C.

More preferentially, the preset temperature is 55° C.

Specifically, according to the remote control method for a washing machine in this embodiment, a potential safety hazard that is to running of the washing machine and that is caused by a control instruction of the mobile terminal can be avoided. For example, when the washing machine is in a drying phase, and the interior of the washing machine is high in temperature, the mobile terminal sends a power-off instruction, an unwitting user opens the high-temperature washing machine, and consequently, an accident occurs. Further, after the control channel is cut off in step S202 and/or step S203, establishing a control channel between the mobile terminal and the washing machine again is not allowed.

In addition, when the washing machine is in a high-temperature condition, and needs to be powered off, the control instruction correspondingly sent by the mobile terminal is executed only after a temperature reduction phase is performed before powering off and the temperature reaches a safe standard, thereby further ensuring the running safety of the washing machine.

Further, after the control channel is cut off in step S202 and/or step S203, establishing a control channel between the mobile terminal and the washing machine again is not allowed.

Specifically, according to the remote control method in this embodiment, after the control channel is cut off by the mobile terminal, reestablishing a control channel between the washing machine and the mobile terminal is prevented. It can be further ensured that remote control of the mobile terminal can be implemented only if it is verified that the washing machine is in a safe condition; and once the pre-verified condition changes, the mobile terminal does not have remote control rights any more based on a condition pre-verified before. Therefore, it is ensured that the mobile terminal remotely controls the washing machine safely.

In this embodiment, the remote control method for a washing machine includes the following steps:

S211: an APP on a mobile terminal is initiated, and the status feedback channel is established.

212. a control request is sent to the washing machine by the mobile terminal.

S213: whether the activation key 2 is activated is determined; and if yes, the control channel is established, and then a next step is performed; and if not, it is indicated that remote control authorization fails.

S202. whether the activation key 2 and/or a function key of the washing machine are/is triggered is detected; and if yes, CCC) is performed; and if not, AAA) is performed.

AAA): whether a cloth washing program of the washing machine ends is detected; and if yes, BBB) is performed; and if not, the cloth washing program is continuously executed, and then S203 is performed.

BBB): timing is started; whether the mobile terminal sends a control instruction to the washing machine within a specified time is determined; and if not, the control channel is cut off, and the status feedback channel is maintained; and if yes, S203 is performed.

CCC): a control instruction sent by using the function key is acquired; whether the control instruction is a stop instruction or a stop drying instruction is determined; and if yes, DDD) is performed; and if not, the control channel between the mobile terminal and the washing machine is cut off, and the status feedback channel is maintained.

DDD): whether the washing machine is in a drying phase is detected; and if yes, EEE) is performed; and if not, the control channel is cut off, the status feedback channel is maintained, and then the control instruction is performed.

EEE): whether a temperature of the washing machine exceeds a preset temperature is determined; and if yes, the door lock is locked, a temperature reduction phase is performed, the control instruction is executed after the temperature in the washing machine decreases to the specified temperature, then the control channel is cut off, and the status feedback channel is maintained; and if not, the control channel is cut off, and the status feedback channel is maintained.

S203: whether the door lock of the washing machine is unlocked is determined; and if yes, the control channel is cut off, and the status feedback channel is maintained; and if not, the control channel and the status feedback channel are maintained, and then S202 is performed.

Embodiment 5

Figure 11:
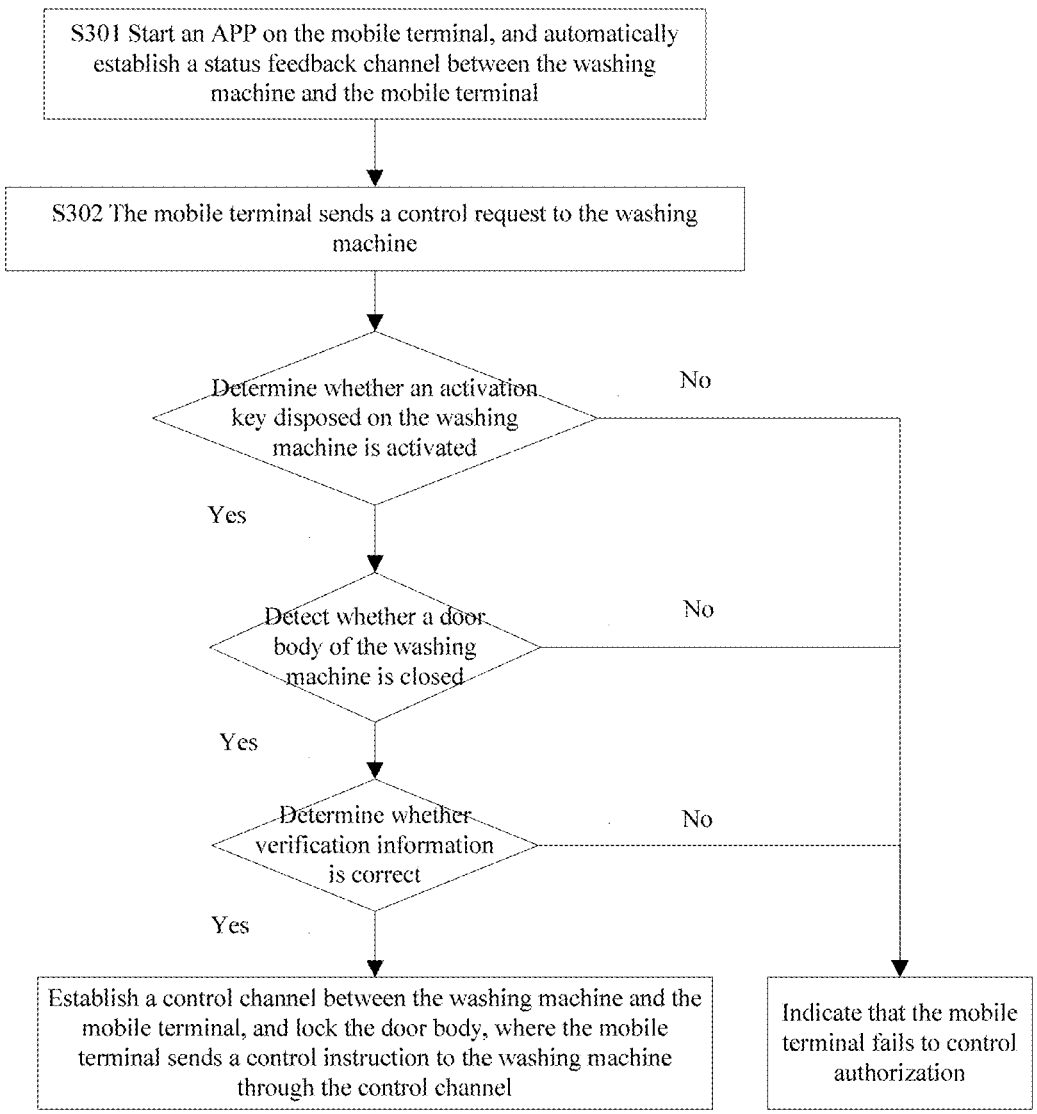
FIG. 11 is a flowchart of a remote control method according to another embodiment of the present disclosure.
Figure 12:
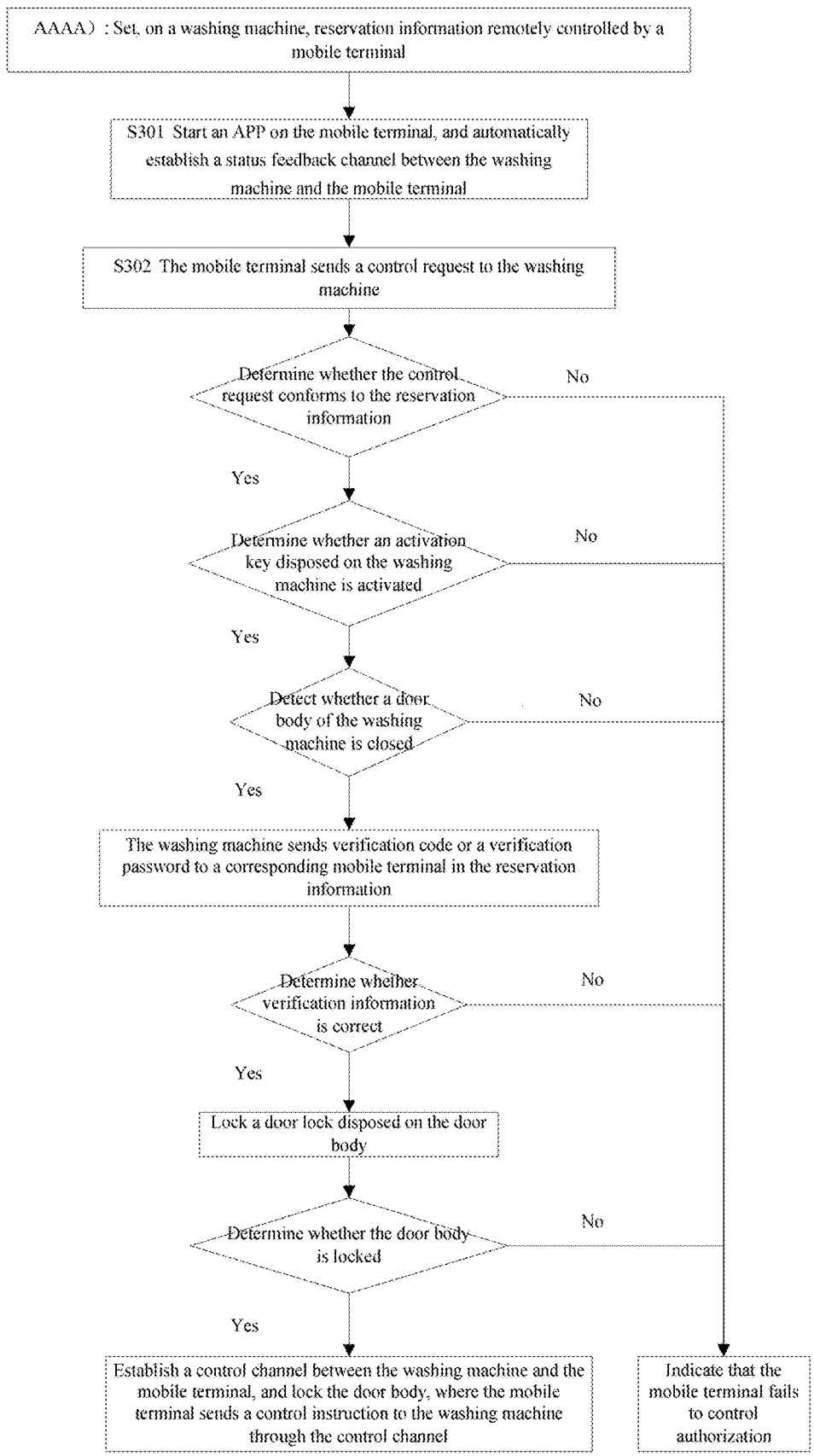
FIG. 12 is a flowchart of a remote control method according to another embodiment of the present disclosure.

As shown in FIG. 11 and FIG. 12, the present disclosure further provides a remote control method for a washing machine, characterized in that a washing machine and a mobile terminal in wireless connection with the washing machine are used, and the remote control method includes the following steps: a status feedback channel that is configured to transmit a working status of the washing machine and that is between the washing machine and the mobile terminal is established; and after an activation key 2 disposed on the washing machine is triggered and a door body of the washing machine is closed, a control channel that is configured to transmit a control instruction and that is between the washing machine and the mobile terminal is established.

Specifically, in this embodiment, the remote control method for a washing machine mainly aims to ensure running safety when the washing machine is remotely controlled by the mobile terminal, and avoid such a running failure of the washing machine that the mobile terminal is rashly used to remotely control the washing machine when the door body of the washing machine is not closed.

Further, after the activation key 2 on the washing machine is activated, and the door body of the washing machine is closed, verification information is fed back to the mobile terminal. A control channel that is configured to transmit a working status of the washing machine and that is between the washing machine and the mobile terminal is established only after the verification information passes verification.

Specifically, in this embodiment, the remote control method for a washing machine mainly aims to ensure running safety when the washing machine is remotely controlled by the mobile terminal, and avoid safety accidents (for example, when a child plays in the washing machine, the washing machine is remotely controlled to execute a cloth washing program) caused when a user cannot observe a running status or an ambient environment condition of the washing machine and the mobile terminal is rashly used to control the washing machine to execute a cloth washing program. Alternatively, if the door body of the washing machine is not closed, the washing machine in a remote control state cannot perform any washing operation. Therefore, according to the remote control method in this embodiment, a status feedback channel that is configured to transmit a working status of the washing machine and that is between the washing machine and the mobile terminal is established, to feed back status information of the washing machine to the mobile terminal in real time. In order to establish a control channel that is configured to transmit a control instruction and that is between the washing machine and the mobile terminal, first, it needs to be pre-ensured or ensured, by a person who controls the washing machine in advance or another person, that the washing machine is in a safe state, then it needs to be ensured that the door body of the washing machine is in a closed state, and finally, it also needs to be ensured that the mobile terminal passes verification of the verification information. Therefore, triple protection on remote control of the washing machine is implemented, running safety of the washing machine is improved, and safety accidents are avoided.

Further, the remote control method includes the following steps:

S301: an APP on the mobile terminal is initiated, and a status feedback channel between the washing machine and the mobile terminal is automatically established.

S302: a control request is sent to the washing machine by the mobile terminal.

S303: whether the activation key 2 disposed on the washing machine is activated is determined; and if yes, a next step is performed; and if not, it is indicated that remote control authorization fails.

S304: whether a door body of the washing machine is closed is detected; and if yes, verification information is fed back to the mobile terminal; and if not, it is indicated that the mobile terminal fails to control authorization.

S305: whether verification information is correct is determined; and if yes, a control channel between the washing machine and the mobile terminal is established, and the door body is locked, wherein the mobile terminal sends a control instruction to the washing machine through the control channel; and if not, it is indicated that remote control authorization fails.

Further, according to the remote control method, the washing machine feeds back verification information to the mobile terminal.

Alternatively, a cloud server that is separately connected to the washing machine and the mobile terminal feeds back verification information to the mobile terminal.

Further, the verification information includes one or any combination of model information of the washing machine, user information, verification code, or verification password.

Preferentially, the verification code is randomly generated by the washing machine/cloud server, or preset by a user.

Alternatively, the verification password is randomly generated by the washing machine/cloud server, or preset by a user.

Further, it is determined, by pressing the activation key 2 and inputting activation information in the remote control method and based on the activation information, that the activation key 2 is activated.

Alternatively, a near-field sensing module disposed on the activation key 2 performs near-field sensing with the mobile terminal, so as to obtain the activation information, and determine, based on the activation information, that the activation key 2 is activated.

Specifically, in this embodiment, the washing machine includes a controller. The activation key 2 is connected to the controller in a wired or wireless manner. The activation key 2 includes a communication module configured to communicatively connect to the controller and a detection module configured to detect whether the key is triggered. When the detection module detects that the activation key 2 is triggered, a signal is sent to the controller by using the communication module. After receiving the signal, the controller authorizes the intelligent terminal to remotely control the washing machine.

The detection module that controls the key detects activation information that is input by a user by using the activation key 2 to determine whether the activation key 2 is in an activated state, and then performs a next step.

Alternatively, the activation device includes a near-field recognition unit. When the intelligent terminal is within the recognition range of the near-field recognition unit, the washing machine authorizes the intelligent terminal to remotely control the washing machine. The near-field recognition unit of the activation key 2 performs near-field communication with the mobile terminal, obtains activation information to determine whether the activation key 2 is in an activated state, and then performs a next step.

In this embodiment, a user can use the mobile terminal to remotely control the washing machine only after a person who controls the washing machine in advance or another person pre-ensures that the washing machine is in a safe state, so that the remote control method for a washing machine has a better safety performance.

Further, before step S301, or between step S301 and step S302, the method further includes step AAAA): reservation information remotely controlled by a mobile terminal is set on a washing machine.

The reservation information includes one or any combination of a control request validity time, mobile terminal information, verification code, or verification password.

Further, between step S302 and step S303, or after it is determined in step S303 that the activation key 2 disposed on the washing machine is activated, or after it is detected in step S304 that the door body of the washing machine is closed, the method further includes step BBBB): whether the control request conforms to the reservation information is determined; and if yes, a next step is performed; and if not, it is indicated that remote control authorization fails.

Further, after it is detected in step S304 that the door body of the washing machine is closed, the washing machine sends verification code or a verification password to a corresponding mobile terminal in the reservation information.

Alternatively, after it is determined in step BBBB) that the control request conforms to the reservation information, the washing machine sends verification code or a verification password to a corresponding mobile terminal in the reservation information.

Further, after it is detected in step S304 that the door body of the washing machine is closed, or after it is determined in step S305 that the verification information is correct, the method further includes step CCCC): a door lock disposed on the door body is locked, and then whether the door body is locked is determined; and if yes, a next step is performed; and if not, it is indicated that remote control authorization fails.

Specifically, in this embodiment, further verification is performed by using the verification information, to ensure safety in remotely controlling the washing machine by the mobile terminal. Therefore, the washing machine is prevented from being arbitrarily controlled by another user, which causes unsafe running of the washing machine.

In this embodiment, the remote control method for a washing machine includes the following steps:

AAAA): reservation information remotely controlled by a mobile terminal is set on a washing machine.

S301: an APP on the mobile terminal is initiated, and a status feedback channel between the washing machine and the mobile terminal is automatically established.

S302: a control request is sent to the washing machine by the mobile terminal.

BBBB): whether the control request conforms to the reservation information is determined; and if yes, S303 is performed; and if not, it is indicated that remote control authorization fails.

S303: whether the activation key 2 disposed on the washing machine is activated is determined; and if yes, S304 is performed; and if not, it is indicated that remote control authorization fails.

S304: whether a door body of the washing machine is closed is detected; and if yes, the washing machine sends verification code or a verification password to a corresponding mobile terminal in the reservation information; and if not, it is indicated that the mobile terminal fails to control authorization.

S305: whether verification information is correct is determined; and if yes, CCCC) is performed; and if not, it is indicated that remote control authorization fails.

CCCC): a door lock disposed on the door body is locked, and then whether the door body is locked is determined; and if yes, a control channel between the washing machine and the mobile terminal is established, and the door body is locked, wherein the mobile terminal sends a control instruction to the washing machine through the control channel; and if not, it is indicated that remote control authorization fails.

Embodiment 6

Figure 13:
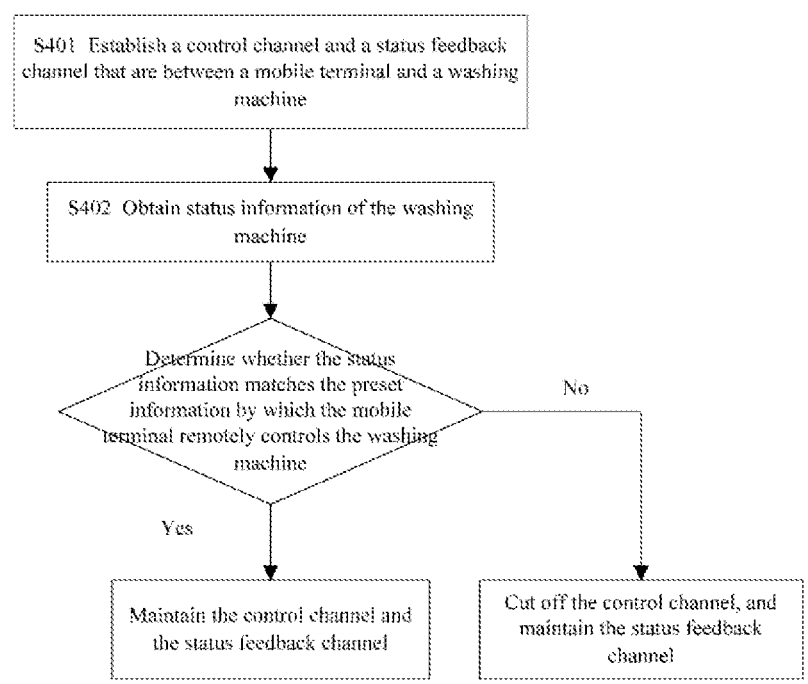
FIG. 13 is a flowchart of a remote control method according to another embodiment of the present disclosure.
Figure 14:
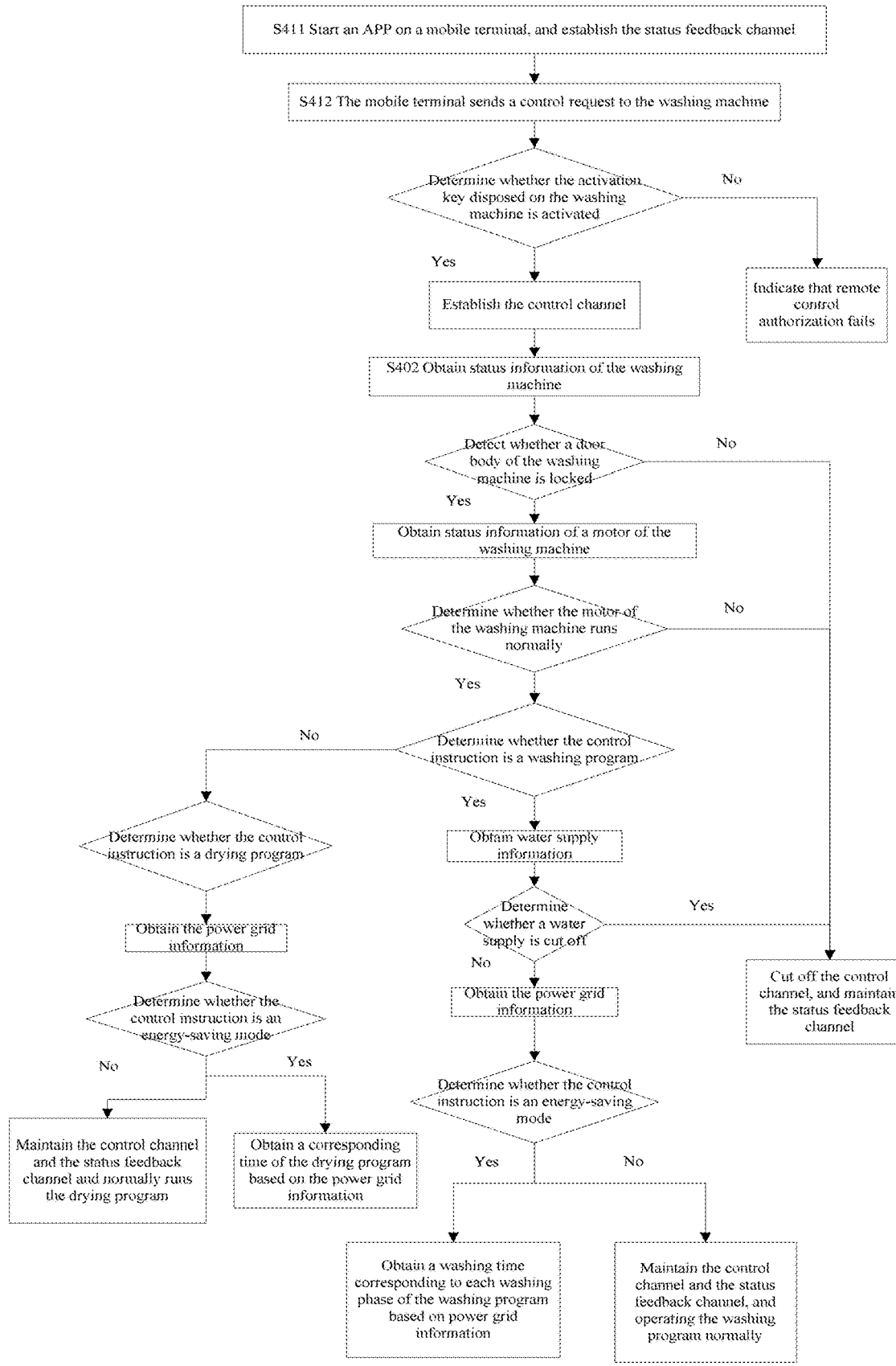
FIG. 14 is a flowchart of a remote control method according to another embodiment of the present disclosure.

As shown in FIG. 13 and FIG. 14, the present disclosure further provides a remote control method for a washing machine, characterized in that a washing machine and a mobile terminal in wireless connection with the washing machine are used, and the remote control method includes the following steps: between the mobile terminal and the washing machine, a control channel configured to transmit a control instruction and a status feedback channel configured to transmit a working status of the washing machine are established; status information of the washing machine is acquired; and when the status information does not match preset information by which the mobile terminal remotely controls the washing machine, the control channel is cut off, and the status feedback channel is maintained.

Specifically, the remote control method in this embodiment mainly aims to avoid such a case that when the mobile terminal remotely controls the washing machine, the status information of the washing machine cannot be obtained accurately due to a long distance, and consequently, the control instruction sent by the mobile terminal cannot be executed, or the mobile terminal operates the washing machine in error. Therefore, according to the remote control method in this embodiment, when the washing machine that can be remotely operated by the mobile terminal is disposed, status conditions corresponding to the washing machine are centralized, and then preset information by which the mobile terminal remotely controls the washing machine is formed accordingly. In addition, it is determined whether real-time status information of the washing machine matches the preset information, and if the real-time status information of the washing machine matches the preset information, the mobile terminal remotely controls the washing machine.

Further, the status information includes one or any combination of status information of each device of the washing machine, door body information, running status information of the washing machine, power grid information, or water supply information.

Preferentially, the status information of each device of the washing machine includes status information of a motor, and/or status information of a drying device.

Specifically, according to the remote control method in this embodiment, when the status information is that a motor runs normally, a door body is locked, water is supplied normally, and power is supplied normally, the control channel and the status feedback channel are maintained. When the status information is that a motor runs normally, a door body is locked, water is supplied normally, power supply is to be cut off at 3 PM, and a time at which the control instruction is predicted to be finished is 5 PM, the control channel is cut off, and the status feedback channel is maintained. Therefore, cases, caused when the mobile terminal forcibly and remotely controls the washing machine to execute the program, the program cannot be finished in time and clothes are soaked in water for a long time and are dyed are avoided.

Further, the remote control method includes the following steps:

S401: a control channel and a status feedback channel that are between the mobile terminal and the washing machine are established.

S402: status information of the washing machine is obtained

S403: whether the status information matches the preset information by which the mobile terminal remotely controls the washing machine is determined; and if yes, the control channel and the status feedback channel are maintained; and if not, the control channel is cut off, and the status feedback channel is maintained.

Further, the step S401 of establishing a control channel and a status feedback channel that are between the mobile terminal and the washing machine includes the following steps:

S411: an APP on a mobile terminal is initiated, and the status feedback channel is established.

S412: a control request is sent to the washing machine by the mobile terminal.

S413: whether the activation key 2 disposed on the washing machine is activated is determined; and if yes, a next step is performed; and if not, it is indicated that remote control authorization fails.

Further, the determining whether the status information matches the preset information by which the mobile terminal remotely controls the washing machine in step S403 includes the following steps:

S431: whether the door body of the washing machine is locked is detected; and if not, the control channel is cut off, and the status feedback channel is maintained; and if yes, the control channel and the status feedback channel are maintained, and then S432 is performed.

S432: status information of a motor of the washing machine is obtained; whether the motor of the washing machine runs normally is detected; and if not, the control channel is cut off, and the status feedback channel is maintained; and if yes, the control channel and the status feedback channel are maintained, and then a next step is performed.

Further, before step S432, or after it is determined in step S432 that the motor of the washing machine runs normally, the method further includes S433: status information of a drying device of the washing machine is obtained; whether the drying device runs normally is detected; and if not, the control channel is cut off, and the status feedback channel is maintained; and if yes, the control channel and the status feedback channel are maintained, and then a next step is performed Specifically, in this embodiment, the door body, the motor, the drying device and the like of the washing machine are detected in advance, so that the mobile terminal can control the washing machine safely and stably, and a control instruction sent by the mobile terminal to the washing machine can be finished in time.

Further, after it is determined in step S403 that the status information matches the preset information by which the mobile terminal remotely controls the washing machine, the method further includes S404: a control instruction sent by the mobile terminal to the washing machine is obtained.

Further, after step S404, the method further includes S405: whether the control instruction matches the status information is determined; and if yes, the control channel and the status feedback channel are maintained, and then a next step is performed; and if not, the control channel is cut off, and the status feedback channel is maintained.

Further, in step S405, the method includes the following steps:

S451: whether the control instruction is a washing program is determined; and if yes, S452 is performed; and if not, a next step is performed.

S452: water supply information is obtained; whether a water supply is cut off is determined; and if yes, the control channel is cut off, and the status feedback channel is maintained; and if not, the control channel and the status feedback channel are maintained, and then S453 is performed.

S453: power grid information is obtained; whether the control instruction is an energy-saving mode is determined; and if yes, a washing time corresponding to each washing phase of the washing program is obtained based on the power grid information; and if not, normal running is performed.

Preferentially, the power grid information includes a step tariff and power consumption trend information.

Specifically, in this embodiment, when the control instruction is the energy-saving mode, a washing time corresponding to each washing phase of the washing program is mainly adjusted based on the power grid information in such a manner that energy consumption parameters in each washing phase are compared with the power grid information to obtain a washing time corresponding to each washing phase. For example, a high-power consumption dewatering phase is set to be run when a power grid is at an ebb stage. Therefore, power consumption of the washing machine can be further reduced, and intelligentization of the remote control method is realized.

Alternatively, in this embodiment, after it is determined in step S451 that the control instruction is not a washing program, the method further includes the following steps:

S461: whether the control instruction is a drying program is determined; and if yes, S462 is performed; and if not, a next step is performed.

S462: power grid information is obtained; whether the control instruction is an energy-saving mode is determined; and if yes, a running time corresponding to the drying program is obtained based on the power grid information; and if not, the drying program is run normally.

Specifically, in this embodiment, when the control instruction is the energy-saving mode, the running time corresponding to the drying program is adjusted based on the power grid information, and the drying program is executed. For example, when a power grid is at a peak stage, the drying program is paused. When a power grid is at an ebb stage, the drying program is started and executed.

Further, after the control channel is cut off in the remote control method, establishing a control channel between the mobile terminal and the washing machine again is not allowed.

In this embodiment, the remote control method for a washing machine includes the following steps:

S411: an APP on a mobile terminal is initiated, and the status feedback channel is established.

S412: a control request is sent to the washing machine by the mobile terminal.

S413: whether the activation key 2 disposed on the washing machine is activated is determined; and if yes, the control channel is established, and then S402 is performed; and if not, it is indicated that remote control authorization fails.

S402: status information of the washing machine is obtained.

S431: whether a door body of the washing machine is locked is detected; and if yes, the control channel is cut off, and the status feedback channel is maintained; and if not, S432 is performed.

S432: status information of a motor of the washing machine is obtained; whether the motor of the washing machine runs normally is determined; and if not, the control channel is cut off, and the status feedback channel is maintained; and if yes, S451 is performed.

S451: whether the control instruction is a washing program is determined; and if yes, S452 is performed; and if not, a next step is performed.

S452: water supply information is obtained; whether a water supply is cut off is determined; and if yes, the control channel is cut off, and the status feedback channel is maintained; and if not, S453 is performed.

S453: power grid information is obtained, whether the control instruction is an energy-saving mode is determined; and if yes, a washing time corresponding to each washing phase of the washing program is obtained based on the power grid information; and if not, the control channel and the status feedback channel are maintained, and the washing program is operated normally.

S461: whether the control instruction is a drying program is determined; and if yes, S462 is performed; and if not, a next step is performed.

S462: power grid information is obtained; whether control instruction is an energy-saving mode is determined; and if yes, a corresponding time of the drying program is obtained based on the power grid information; and if not, the control channel and the status feedback channel are maintained, and the drying program is run normally.

Implementation solutions in the foregoing embodiments may be further combined or replaced. The embodiments are merely used to describe example embodiments in the present disclosure, but are not intended to limit a concept and a range of the present disclosure. Various modifications and variations to the solutions of the present disclosure made by a person skilled in the art without departing from the design idea of the present disclosure all belong to the protection scope of the present disclosure.

The invention claimed is:

1. A remote control method for a washing machine, wherein the washing machine is in wireless connection with a mobile terminal, and the remote control method comprises the following steps:
    establishing, between the mobile terminal and the washing machine, a control channel used to transmit a control instruction and a status feedback channel used to transmit a working status of the washing machine;
    obtaining status information of the washing machine; and
    cutting off the control channel, and keeping the status feedback channel open, when the status information does not match preset information by which the mobile terminal remotely controls the washing machine.

2. The remote control method for the washing machine according to claim 1, wherein the status information comprises one or more than one kind of information selected from a group consisting status information of each device of the washing machine, door body information, running status information of the washing machine, power grid information, and water supply information.

3. The remote control method for the washing machine according to claim 1, wherein the remote control method comprises the following steps:
    S401: establishing the control channel and the status feedback channel between the mobile terminal and the washing machine;
    S402: obtaining the status information of the washing machine; and
    S403: determining whether the status information matches the preset information by which the mobile terminal remotely controls the washing machine;
    and if the status information matches the preset information, keeping the control channel and the status feedback channel open; and if the status information does not match the preset information, cutting off the control channel, and keeping the status feedback channel open.

4. The remote control method for the washing machine according to claim 3, wherein the step S401 of establishing the control channel and the status feedback channel between the mobile terminal and the washing machine comprises:
    S411: initiating an APP on the mobile terminal, and establishing the status feedback channel;
    S412: sending a control request to the washing machine by the mobile terminal; and
    S413: determining whether an activation key disposed on the washing machine is activated; and if the activation key is activated, establishing the control channel, and performing a next step; and if the activation key is not activated, indicating that a remote control authorization fails.

5. The remote control method for the washing machine according to claim 3, wherein the step S403 of determining whether the status information matches the preset information by which the mobile terminal remotely controls the washing machine comprises:
    S431: detecting whether a door body of the washing machine is locked; and if does not detect the door body is locked, cutting off the control channel, and keeping the status feedback channel open; and if detects the door body is locked, performing S432; and
    S432: obtaining the status information of the motor of the washing machine, and determining whether the motor of the washing machine runs normally; and if the motor runs abnormally, cutting off the control channel, and keeping the status feedback channel open; and if the motor runs normally, keeping the control channel and the status feedback channel open, and then performing a next step.

6. The remote control method for the washing machine according to claim 5, comprising step S433 before step S432, or after it is determined in step S432 that the motor of the washing machine runs normally,
    step S433 comprising: obtaining the status information of the drying device of the washing machine,
    determining whether the drying device runs normally; and if the drying device runs abnormally, cutting off the control channel, and keeping the status feedback channel open; and if the drying device runs normally, keeping the control channel and the status feedback channel open, and then performing a next step.

7. The remote control method for the washing machine according to claim 3 comprising step S404 after it is determined in step S403 that the status information matches the preset information by which the mobile terminal remotely controls the washing machine, and step S404 comprising: obtaining the control instruction sent by the mobile terminal to the washing machine.

8. The remote control method for the washing machine according to claim 7, comprising step S405 after step S404, step S405 comprising: determining whether the control instruction matches the status information; and if the control instruction matches the status information, keeping the control channel and the status feedback channel open, and then performing a next step; and if the control instruction does not match the status information, cutting off the control channel, and keeping the status feedback channel open.

9. The remote control method for the washing machine according to claim 8, wherein the step S405 comprises:
S451: determining whether the control instruction is a washing program; and if the control instruction is the washing program, performing S452; and if the control instruction is not the washing program, performing a next step;
S452: obtaining the water supply information, and determining whether a water supply is cut off; and if the water supply is cut off, cutting off the control channel, and keeping the status feedback channel open; and if the water supply is not cut off, keeping the control channel and the status feedback channel open, and then performing S453; and
S453: obtaining the power grid information, and determining whether the control instruction is an energy-saving mode; and if the control instruction is the energy-saving mode, obtaining a washing time corresponding to each washing phase of the washing program based on the power grid information; and if the control instruction is not the energy-saving mode, keeping the control channel and the status feedback channel open, and operating the washing program normally.

10. The remote control method for the washing machine according to claim 1, wherein after the control channel is cut off in the remote control method, reestablishing a control channel between the mobile terminal and the washing machine again is not allowed.

11. The remote control method for the washing machine according to claim 2, wherein the status information of each device of the washing machine comprises status information of a motor, and/or status information of a drying device.

12. The remote control method for the washing machine according to claim 2, wherein the remote control method comprises the following steps:
S401: establishing the control channel and the status feedback channel between the mobile terminal and the washing machine;
S402: obtaining the status information of the washing machine; and
S403: determining whether the status information matches the preset information by which the mobile terminal remotely controls the washing machine;
and if the status information matches the preset information, keeping the control channel and the status feedback channel open; and if the status information does not match the preset information, cutting off the control channel, and keeping the status feedback channel open.

13. The remote control method for the washing machine according to claim 4, wherein the step S403 of determining whether the status information matches the preset information by which the mobile terminal remotely controls the washing machine comprises:
S431: detecting whether a door body of the washing machine is locked; and if does not detect the door body is locked, cutting off the control channel, and keeping the status feedback channel open; and if detects the door body is locked, performing S432; and
S432: obtaining the status information of the motor of the washing machine, and determining whether the motor of the washing machine runs normally; and if the motor runs abnormally, cutting off the control channel, and keeping the status feedback channel open; and if the motor runs normally, keeping the control channel and the status feedback channel open, and then performing a next step.

14. The remote control method for the washing machine according to claim 9, wherein the power grid information comprises a step tariff and power consumption trend information.

* * * * *